US012270901B2

(12) United States Patent
Yang et al.

(10) Patent No.: US 12,270,901 B2
(45) Date of Patent: Apr. 8, 2025

(54) PROCESSING CIRCUITRY, SYSTEM AND METHOD FOR REDUCING ELECTRICAL POWER CONSUMPTION IN AN ULTRASOUND IMAGING PROBE BASED ON INTERLACED DATA ACQUISITION AND RECONSTRUCTION ALGORITHM

(71) Applicant: Exo Imaging, Inc., Redwood City, CA (US)

(72) Inventors: Yongyi Yang, Westmont, IL (US); Miles N. Wernick, Evanston, IL (US)

(73) Assignee: Exo Imaging, Inc., Santa Clara, CA (US)

( * ) Notice: Subject to any disclaimer, the term of this patent is extended or adjusted under 35 U.S.C. 154(b) by 0 days.

(21) Appl. No.: 17/698,125

(22) Filed: Mar. 18, 2022

(65) Prior Publication Data

US 2022/0299634 A1 Sep. 22, 2022

Related U.S. Application Data

(60) Provisional application No. 63/163,702, filed on Mar. 19, 2021.

(51) Int. Cl.
*G01S 15/89* (2006.01)
*G01S 7/52* (2006.01)

(52) U.S. Cl.
CPC ........ *G01S 15/8977* (2013.01); *G01S 7/5202* (2013.01); *G01S 7/52026* (2013.01);
(Continued)

(58) Field of Classification Search
None
See application file for complete search history.

(56) References Cited

U.S. PATENT DOCUMENTS 6,390,980 B1 * 5/2002 Peterson ............ G01S 7/52085
600/443
6,540,681 B1 4/2003 Cheng et al.
(Continued)

FOREIGN PATENT DOCUMENTS

WO 2019155125 A1 8/2019
WO 2020068473 A1 4/2020

OTHER PUBLICATIONS van Soest, Gijs, Johan G. Bosch, and Antonius FW van der Steen. "Azimuthal registration of image sequences affected by nonuniform rotation distortion." IEEE Transactions on Information Technology in Biomedicine 12.3 (2008): 348-355. (Year: 2008).*
(Continued)

*Primary Examiner* — Isam A Alsomiri
*Assistant Examiner* — Jonathan D Armstrong
(74) *Attorney, Agent, or Firm* — Alliance IP, LLC

(57) ABSTRACT

An interlaced data acquisition scheme is employed in an ultrasound imaging device to reduce the amount of electrical power consumed by the device's transmit firings when collecting video data. Reducing electrical consumption according to the present disclosure reduces battery size, weight and cost; reduces heat generation; reduces need for heat-dissipating materials in the probe and prolongs probe uptime. A reconstruction algorithm is employed to produce images from the interlaced data that are comparable in quality to videos that would be obtained by a conventional (non-interlaced) image acquisition.

25 Claims, 17 Drawing Sheets

(52) U.S. Cl.
CPC ...... *G01S 7/52044* (2013.01); *G01S 7/52085* (2013.01); *G01S 15/8934* (2013.01)

(56) References Cited

U.S. PATENT DOCUMENTS

| | | | |
|---|---|---|---|
| 7,996,688 B2* | 8/2011 | Little | A61B 8/56 600/407 |
| 10,898,167 B2* | 1/2021 | Willsie | A61B 8/4427 |
| 11,199,623 B2* | 12/2021 | Haque | B06B 1/0215 |
| 2002/0090140 A1* | 7/2002 | Thirsk | G06T 9/00 382/128 |
| 2006/0058652 A1* | 3/2006 | Little | A61B 8/56 600/437 |
| 2006/0058670 A1* | 3/2006 | Lin | G01S 7/52047 600/447 |
| 2007/0161904 A1* | 7/2007 | Urbano | A61B 8/4438 600/459 |
| 2007/0167816 A1 | 7/2007 | Koste et al. | |
| 2008/0114239 A1* | 5/2008 | Randall | G01S 7/5208 600/437 |
| 2010/0030076 A1* | 2/2010 | Vortman | G01S 7/5209 601/2 |
| 2016/0063742 A1 | 3/2016 | Steen et al. | |
| 2018/0192999 A1 | 7/2018 | Song et al. | |
| 2019/0175149 A1* | 6/2019 | Dickie | A61B 8/4254 |
| 2019/0261954 A1* | 8/2019 | Chen | G01S 7/52017 |
| 2021/0124044 A1* | 4/2021 | Haque | A61B 8/08 |
| 2021/0278530 A1* | 9/2021 | Haque | G01N 29/345 |
| 2021/0353251 A1* | 11/2021 | Hope Simpson | G01S 7/5202 |
| 2022/0066026 A1* | 3/2022 | Haque | H10N 30/2047 |
| 2022/0155440 A1* | 5/2022 | Kruse | G01S 15/8977 |

OTHER PUBLICATIONS

Foiret, Josquin, et al. "Ultrasound localization microscopy to image and assess microvasculature in a rat kidney." Scientific reports 7.1 (2017): 13662. (Year: 2017).*

Kim, Bae-Hyung, and Tai-Kyong Song. "Multi-Beam Simultaneous Transmit Multi-Zone (MB-STMZ) focusing method using modulated orthogonal codes for ultrasound imaging." Medical Imaging 2004: Ultrasonic Imaging and Signal Processing. vol. 5373. SPIE, 2004. (Year: 2004).*

PCT, International Search Report and Written Opinion issued in PCT/US2022/020945, dated Jul. 8, 2022; 9 pages.

EPO European Extended Search Report in EP Application Serial No. 22772287.3 mailed on Jan. 7, 2025, 11 pages.

* cited by examiner

PROCESSING CIRCUITRY, SYSTEM AND METHOD FOR REDUCING ELECTRICAL POWER CONSUMPTION IN AN ULTRASOUND IMAGING PROBE BASED ON INTERLACED DATA ACQUISITION AND RECONSTRUCTION ALGORITHM

CROSS-REFERENCE TO RELATED APPLICATION

This application claims the benefit of priority under 35 U.S.C. § 119(e) of U.S. Provisional Application Ser. No. 63/163,702, filed Mar. 19, 2021, entitled "PROCESSING CIRCUITRY, SYSTEM AND METHOD FOR REDUCING ELECTRICAL POWER CONSUMPTION IN AN ULTRASOUND IMAGING PROBE BASED ON INTERLACED DATA ACQUISITION AND RECONSTRUCTION ALGORITHM." The disclosure of the prior application is considered a part of and is incorporated by reference in its entirety in the disclosure of this application.

BACKGROUND

Ultrasound imaging is widely used in the fields of medicine and non-destructive testing. Conventional ultrasound imaging devices are bulky and costly, and there exists a need for portable, low-cost, handheld ultrasound devices.

SUMMARY

As with other handheld electronic devices, there exists a need to limit electrical power consumption in portable ultrasound probes, thereby reducing demands on the battery, and to alleviate issues related to heat produced within the probe during operation. Reduction of electrical power consumption can translate into reduced cost, size, and weight of the probe, while providing greater convenience and clinical effectiveness. Specific advantages include: 1) reduced battery size, weight, and cost; 2) reduced heat generation; 3) reduced need for heat-dissipating materials in the probe (further reducing device size, weight, and cost); and 4) prolonged probe uptime.

Some embodiments use a combination of an interlaced data acquisition scheme and a computerized image reconstruction algorithm to reduce the amount of electrical power consumed by transmit firings in an ultrasound imaging probe when collecting video data. A goal of the reconstruction algorithm according to some embodiments is to produce videos from interlaced data that are comparable in quality to videos that would be obtained by a conventional (non-interlaced) image acquisition.

Additional aspects and advantages of the present disclosure will become readily apparent to those skilled in this art from the following detailed description, wherein only illustrative embodiments of the present disclosure are shown and described. Embodiments are not limited to those expressly described herein, and several details related to the same are capable of modifications in various obvious respects, all without departing from the disclosure. Accordingly, the drawings and description are to be regarded as illustrative in nature, and not as restrictive.

BRIEF DESCRIPTION OF THE DRAWINGS

Some of the features of the embodiments are set forth with particularity in the appended claims. A better understanding of the features and advantages of embodiments will be obtained by reference to the following detailed description, in which the principles of the embodiments are utilized, and the accompanying drawings (also "Figure" and "Fig." herein), of which:

DETAILED DESCRIPTION

Figure 1:
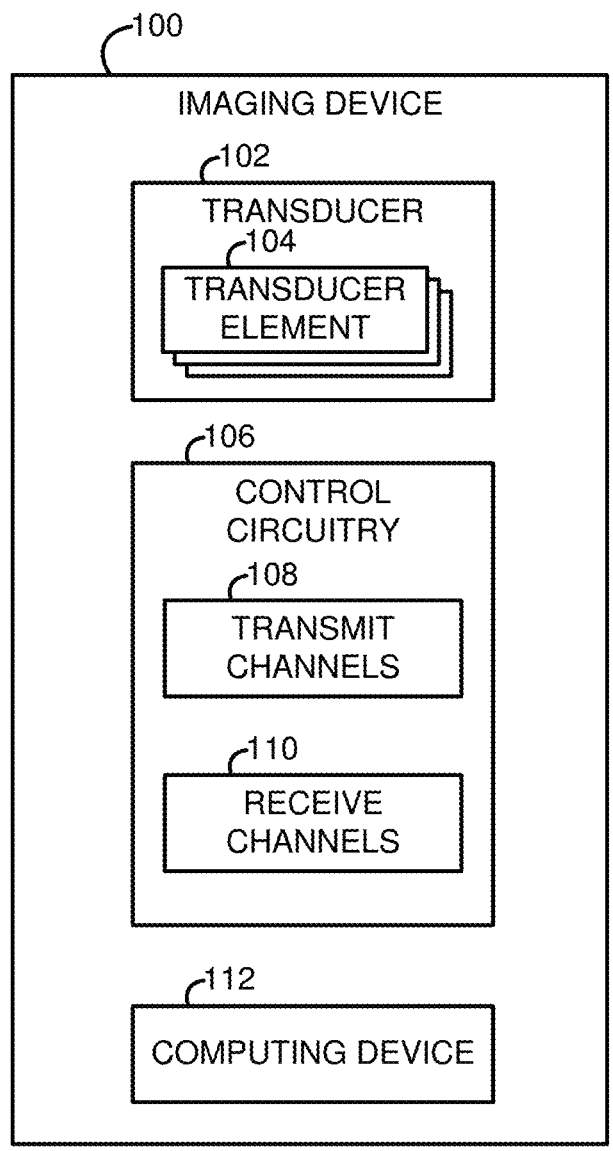
FIG. 1 is a block diagram of an imaging device with selectively alterable characteristics, in accordance with disclosed embodiments.

One aim of embodiments is to reduce the electrical power consumption required to produce transmit (Tx) firings used in ultrasound imaging while maintaining image quality. Direct benefits of reducing the electrical consumption required to produce Tx firings include: (1) reduced battery size, weight, and cost; 2) reduced heat generation; 3) reduced need for heat-dissipating materials in the probe (further reducing device size, weight and cost); and 4) prolonged probe uptime.

In general, the embodiments relate to imaging devices, and more particularly to imaging devices having electronically configurable ultrasonic transducer elements and associated image reconstruction circuitry. Non-intrusive imaging devices can be used to image internal tissue, bones, blood flow, or organs of human or animal bodies.

Some embodiments of an imaging device may include hardware and/or software to control a selective activation and deactivation of transducer elements of the imaging device to achieve a transmit and receive pattern of ultrasonic waveforms to enable the generation of an image from an object while achieving power savings.

An "ultrasonic waveform" as mentioned herein, for example in a medium such as water, flesh, lens, etc., may, in some embodiments, refers to a compensation of the waveforms of each of the transmitting transducer elements. Although the transducer elements, such as groups of transducer elements, according to some embodiments, may sometimes fire together, they may often be fired separately from one another (e.g. to steer).

It is to be noted that "element pixel" as used herein refers to a single MUT (that is, a device with a single diaphragm or membrane), whereas a transducer "element" may refer to a pixel or to a group of MUTs (group of element pixels) ganged together and behaving as one. "Element pixel" is to be distinguished from "pixel" as used herein, the latter referring to a pixel within a digital frame or image as is commonly understood.

Some embodiments of an imaging device may additionally include hardware and/or software to receive reflected ultrasonic energy from an object to be imaged, and to convert the received ultrasonic energy into electrical signals.

Some embodiments of an imaging device may further include hardware and/or software to construct an image of the object to be imaged, to cause a display of the image, and/or to display the image.

To perform the imaging, an imaging device may transmit an ultrasonic waveform into body tissue toward an object to be imaged, and receive reflected ultrasonic energy from the object. Such an imaging device may include one or more transducer elements, and which may function using photoacoustic or ultrasonic effects. Such transducer elements may be used for imaging, and may further be used in other applications. For example, the transducer elements may be used in medical imaging, for flow measurements in pipes, in speaker and microphone arrays, in lithotripsy, for localized tissue heating for therapeutic purposes, and in highly intensive focused ultrasound (HIFU) surgery.

In the context of embodiments, although ultrasonic waveforms, ultrasonic waves, ultrasonic pressure waves, and/or the use of ultrasound is called out expressly, embodiments are not limited to ultrasound specifically, and include within their scope the generation and processing of waves that can propagate in a body, be reflected back from an object of the body, and be decoded/analyzed/processed to allow generation of information pertaining to the object, such as the generation of an image corresponding to the object on a display device.

Traditionally, imaging devices such as ultrasound imagers used in medical imaging use piezoelectric (PZT) materials or other piezo ceramic and polymer composites. Such imaging devices may include a housing to house the transducers with the PZT material, as well as other electronics that form and display the image on a display unit. To fabricate the bulk PZT elements or the transducers, a thick piezoelectric material slab can be cut into large rectangular shaped PZT elements. These rectangular-shaped PZT elements can be expensive to build, since the manufacturing process involves precisely cutting generally the rectangular-shaped thick PZT or ceramic material and mounting it on substrates with precise spacing. Further, the impedance of the transducers is much higher than the impedance of the transmit/receive electronics for the transducers, which can affect performance.

Still further, such thick bulk PZT elements can require very high voltage pulses, for example 100 volts (V) or more to generate transmission signals. This high drive voltage results in high power dissipation, since the power dissipation in the transducers is proportional to the square of the drive voltage. This high power dissipation generates heat within the imaging device such that cooling arrangements are necessitated. These cooling arrangements increase the manufacturing costs and weights of the imaging devices which makes the imaging devices more burdensome to operate.

Even further, the transmit/receive electronics for the transducers may be located far away from the transducers themselves, thus requiring micro-coax cables between the transducers and transmit/receive electronics. In general, the cables have a precise length for delay and impedance matching, and, quite often, additional impedance matching networks are needed for efficient connection of the transducers through the cables to the electronics.

Embodiments of the present disclosure may be utilized in the context of imaging devices that utilize either piezoelectric micromachined ultrasound transducer (pMUT) or capacitive micromachine ultrasonic transducer (cMUT) technologies, as described in further detail herein.

In general, MUTs, such as both cMUT and pMUT, include a diaphragm (a thin membrane attached at its edges, or at some point in the interior of the probe), whereas a "traditional," bulk PZT element typically consists of a solid piece of material.

Piezoelectric micromachined ultrasound transducers (pMUTs) can be efficiently formed on a substrate leveraging various semiconductor wafer manufacturing operations. Semiconductor wafers may currently come in 6 inch, 8 inch, and 12 inch sizes and are capable of housing hundreds of transducer arrays. These semiconductor wafers start as a silicon substrate on which various processing operations can be performed. An example of such an operation is the formation of $SiO_2$ layers, also known as insulating oxides. Various other operations such as the addition of metal layers to serve as interconnects and bond pads are performed to allow connection to other electronics. Yet another example of a machine operation is the etching of cavities. Compared to the conventional transducers having bulky piezoelectric material, pMUT elements built on semiconductor substrates are less bulky, are cheaper to manufacture, and have simpler and higher performance interconnection between electronics and transducers. As such, they provide greater flexibility in the operational frequency of the imaging device using the same, and potential to generate higher quality images.

In some embodiments, the imaging device may include an application specific integrated circuit (ASIC) that includes one or more transmit drivers, sensing circuitry to process electrical energy corresponding to received ultrasound energy reflected back from the object to be imaged (echo signals), and other processing circuitry to control various other operations. The ASIC can be formed on another semiconductor wafer, or on the same semiconductor wafer. This ASIC can be placed in close proximity to pMUT elements to reduce parasitic losses. As a specific example, the ASIC may be 50 micrometers (μm) or less away from a transducer array including the pMUT elements. In a broader example, there may be less than 100 μm separation between the 2 wafers or 2 die, where each wafer includes many die and a die includes a transducer in the transducer wafer and an ASIC in the ASIC wafer. In some embodiments, the ASIC has a matching footprint relative to the pMUT transducer that includes the pMUT elements, and thus may be stacked for wafer-to-wafer interconnection with the pMUT transducer die, for example with an ASIC wafer being stacked with the transducer die or an ASIC die itself being stacked with the transducer die through interconnects. Alternatively, the transducer can also be developed on top of the ASIC wafer as a single device using low temperature piezo material sputtering and other low temperature processing compatible with ASIC processing.

Wherever the ASIC and the transducer interconnect, according to one embodiment, the two may have similar footprints. More specifically, according to the latter embodiment, a footprint of the ASIC may be an integer multiple or divisor of the pMUT footprint.

Regardless of whether the imaging device uses pMUT elements or cMUT elements in its transducer(s), an imaging device according to some embodiments may include a number of transmit channels and a number of receive channels. Transmit channels are to drive the transducer elements with a voltage pulse at a frequency the elements are responsive to. This causes an ultrasonic waveform to be emitted from the elements, which waveform is to be directed towards an object to be imaged, such as toward an organ in a body. In some examples, the imaging device with the array of transducer elements may make mechanical contact with the body using a gel in between the imaging device and the body. The ultrasonic waveform travels towards the object, i.e., an organ, and a portion of the waveform is reflected back to the transducer elements in the form of received/reflected ultrasonic energy where the received ultrasonic energy may converted to an electrical energy within the imaging device. The received ultrasonic energy may then be further processed by a number of receive channels to convert the received ultrasonic energy to electrical signals, and the electrical signals may be processed by other circuitry to develop an image of the object for display based on the electrical signals.

These transmit and receive channels consume power, and in instruments where there are many channels (to generate high quality images), the power may cause excessive heat buildup in the imaging device. If the temperature of the imaging device rises past a certain value, it may affect operation of the imaging device, could pose a danger to the operator, could pose a danger to a patient, and may be outside of regulatory specifications which define one or more upper temperature thresholds.

An embodiment of an ultrasound imaging device includes a transducer array, and control circuitry including, for example, an application-specific integrated circuit (ASIC), and transmit and receive beamforming circuitry, and optionally additional control electronics. Specifications restrict the maximum permissible imaging device temperature, which in turn, restricts what electronic circuits can be housed in the imaging device, and how the imaging device may be operated. Such restrictions can negatively affect the image quality achieved, including the frame rate of images. Further, imaging devices may be battery-powered, in which case the battery may drain quickly in instruments with many transmit/receive channels as each channel can draw energy when being used.

An imaging device incorporating features of the embodiments may advantageously reduce or resolve these and other technical issues. Specifically, the imaging device may be configured to control transmit (Tx) firings (the transmissions of ultrasonic waveforms from a transducer element) in a manner that controls power dissipation without exceeding temperature limits of the imaging device all while maintaining needed image quality. The number of receive channels and/or transmit channels used to form an image are electronically selectively adaptable (may be selectively activated, powered down, or placed in low power) in order to save power, for example in cases where a lower number of channels is acceptable, that is, where a lower number of channels can still result in a display image that can be useful. As a specific example, each of the number of transmit and/or receive channels may be dynamically controlled, for example by control circuitry of the image device, to reduce power, or may be powered down entirely. Additionally, other characteristics of each channel may also be configurable to reduce power consumption. Such advanced control allows the imaging device to be operated within safe temperature thresholds, and may do so without sacrificing needed image quality. The lower power consumption may also increase battery life where a battery is used to power the imaging device.

In an embodiment, an imaging device may include a handheld casing where transducers and associated electronic circuitries, such as a control circuitry and optionally a computing device are housed. The imaging device may also contain a battery to power the electronic circuitries. As described above, the amount of power consumed by the imaging device may increase the temperature of the imaging device. To ensure satisfactory use of the imaging device and satisfactory imaging device performance, the temperature of the housing or body of the imaging device should remain below a threshold temperature. An imaging device according to some embodiments may be electronically configured to reduce power and temperature notwithstanding the acquisition of high quality images as compared with existing imaging device yielding comparable image quality.

Thus, some embodiments pertain to a high performance, low power, and low cost portable imaging device utilizing either pMUT elements or cMUT elements in a 2D array. In some embodiments, such an array of transducer elements is coupled to an application specific integrated circuit (ASIC) of the imaging device.

In the following description, for purposes of explanation, specific details are set forth in order to provide an understanding of the disclosure. It will be apparent, however, to one skilled in the art that the disclosure can be practiced without these details. Furthermore, one skilled in the art will recognize that examples of the present disclosure, described below, may be implemented in a variety of ways, such as a process, one or more processors (processing circuitry) of a control circuitry, one or more processors (or processing circuitry) of a computing device, a system, a device, or a method on a tangible computer-readable medium.

One skilled in the art shall recognize: (1) that certain fabrication operations may optionally be performed; (2) that operations may not be limited to the specific order set forth herein; and (3) that certain operations may be performed in different orders, including being done contemporaneously.

Elements/components shown in diagrams are illustrative of exemplary embodiments and are meant to avoid obscuring the disclosure. Reference in the specification to "one example," "preferred example," "an example," "examples," "an embodiment," "some embodiments," or "embodiments" means that a particular feature, structure, characteristic, or function described in connection with the example is included in at least one example of the disclosure and may be in more than one example. The appearances of the phrases "in one example," "in an example," "in examples," "in an embodiment," "in some embodiments," or "in embodiments" in various places in the specification are not necessarily all referring to the same example or examples. The terms "include," "including," "comprise," and "comprising" shall be understood to be open terms and any lists that follow are examples and not meant to be limited to the listed items. Any headings used herein are for organizational purposes only and shall not be used to limit the scope of the description or the claims. Furthermore, the use of certain terms in various places in the specification is for illustration and should not be construed as limiting.

Turning now to the figures, FIG. 1 is a block diagram of an imaging device 100 with a controller or control circuitry 106 controlling selectively alterable channels (108, 110) and having imaging computations performed on a computing device 112 according to principles described herein. As described above, the imaging device 100 may be used to generate an image of internal tissue, bones, blood flow, or organs of human or animal bodies. Accordingly, the imaging device 100 may transmit a signal into the body and receive a reflected signal from the body part being imaged. Such imaging devices may include either pMUT or cMUT, which may be referred to as transceivers or imagers, which may be based on photo-acoustic or ultrasonic effects. The imaging device 100 can be used to image other objects as well. For example, the imaging device can be used in medical imaging; flow measurements in pipes, speaker, and microphone arrays; lithotripsy; localized tissue heating for therapeutic; and highly intensive focused ultrasound (HIFU) surgery.

In addition to use with human patients, the imaging device 100 may be used to acquire an image of internal organs of an animal as well. Moreover, in addition to imaging internal organs, the imaging device 100 may also be used to determine direction and velocity of blood flow in arteries and veins as in Doppler mode imaging and may also be used to measure tissue stiffness.

The imaging device 100 may be used to perform different types of imaging. For example, the imaging device 100 may be used to perform one-dimensional imaging, also known as A-Scan, two-dimensional imaging, also known as B scan, three-dimensional imaging, also known as C scan, and Doppler imaging. The imaging device 100 may be switched to different imaging modes, including without limitation linear mode and sector mode, and electronically configured under program control.

To facilitate such imaging, the imaging device 100 includes one or more ultrasound transducers 102, each transducer 102 including an array of ultrasound transducer elements 104. Each ultrasound transducer element 104 may be embodied as any suitable transducer element, such as a pMUT or cMUT element. The transducer elements 104 operate to 1) generate the ultrasonic pressure waves that are to pass through the body or other mass and 2) receive reflected waves (received ultrasonic energy) off the object within the body, or other mass, to be imaged. In some examples, the imaging device 100 may be configured to simultaneously transmit and receive ultrasonic waveforms or ultrasonic pressure waves (pressure waves in short). For example, control circuitry 106 may be configured to control certain transducer elements 104 to send pressure waves toward the target object being imaged while other transducer elements 104, at the same time, receive the pressure waves/ultrasonic energy reflected from the target object, and generate electrical charges based on the same in response to the received waves/received ultrasonic energy/received energy.

In some examples, each transducer element 104 may be configured to transmit or receive signals at a certain frequency and bandwidth associated with a center frequency, as well as, optionally, at additional center frequencies and bandwidths. Such multi-frequency transducer elements 104 may be referred to as multi-modal elements 104 and can expand the bandwidth of the imaging device 100. The transducer element 104 may be able to emit or receive signals at any suitable center frequency, such as about 0.1 to about 100 megahertz. The transducer element 104 may be configured to emit or receive signals at one or more center frequencies in the range from about 3.5 to about 5 megahertz.

To generate the pressure waves, the imaging device 100 may include a number of transmit (Tx) channels 108 and a number of receive (Rx) channels 110. The transmit channels 108 may include a number of components that drive the transducer 102, i.e., the array of transducer elements 104, with a voltage pulse at a frequency that they are responsive to. This causes an ultrasonic waveform to be emitted from the transducer elements 104 towards an object to be imaged.

According to some embodiments, an ultrasonic waveform may include one or more ultrasonic pressure waves transmitted from one or more corresponding transducer elements of the imaging device substantially simultaneously.

The ultrasonic waveform travels towards the object to be imaged and a portion of the waveform is reflected back to the transducer 102, which converts it to an electrical energy through a piezoelectric effect. The receive channels 110 collect electrical energy thus obtained, and process it, and send it for example to the computing device 112, which develops or generates an image that can be displayed.

In some examples, while the number of transmit channels 108 and receive channels 110 in the imaging device 100 may remain constant, and the number of transducer elements 104 that they are coupled to may vary. A coupling of the transmit and receive channels to the transducer elements may be, in one embodiment, controlled by control circuitry 106. In some examples, for example as shown in FIG. 1, the control circuitry may include the transmit channels 108 and in the receive channels 110. For example, the transducer elements 104 of a transducer 102 may be formed into a two-dimensional spatial array with N columns and M rows. In a specific example, the two-dimensional array of transducer elements 104 may have 128 columns and 32 rows. In this example, the imaging device 100 may have up to 128 transmit channels 108 and up to 128 receive channels 110. In this example, each transmit channel 108 and receive channel 110 may be coupled to multiple or single transducer elements 104. For example, depending on the imaging mode (for example, whether a linear mode where a number of transducers transmit ultrasound waves in a same spatial direction, or a sector mode, where a number of transducers transmit ultrasound waves in different spatial directions), each column of transducer elements 104 may be coupled to a single transmit channel 108 and a single receive channel (110). In this example, the transmit channel 108 and receive channel 110 may receive composite signals, which composite signals combine signals received at each transducer element 104 within the respective column. In another example, i.e., during a different imaging mode, each transducer element 104 may be coupled to its dedicated transmit channel 108 and its dedicated receive channel 110. In some embodiments, a transducer element 104 may be coupled to both a transmit channel 108 and a receive channel 110. For example, a transducer element 104 may be adapted to create and transmit an ultrasound pulse and then detect the echo of that pulse in the form of converting the reflected ultrasonic energy into electrical energy.

These transmit and receive channels (108, 110) consume power during operation. In high end instruments where there are many channels for generating high quality images, the power may cause excessive heat buildup in the imaging device 100. Excess heat can be uncomfortable to a patient, and in some cases pose a danger to the patient on whom the imaging device 100 is placed for imaging. Such excess heat is also problematic for an operator of the imaging device 100. Still further, the excess heat may damage the components of the imaging device 100 rendering the imaging device 100 ineffective, or perhaps even inoperable. Accordingly, the transmit channels 108 and receive channels 110 may be selectively adaptable (or selectively adjustable) to 1) reduce power consumption, 2) prevent excess heat buildup, and 3) optimize imaging performance and power consumption needs in real time, i.e., dynamically.

Selectively adjusting the channels (108, 110) may include alternating the pattern of Tx spatial transmissions (or firings) in an interlaced fashion, placing the channels (108, 110) in a powered down state, or placing them in a lower power state. Allowing for the adjustment of channels (108, 110) prevents excess heat buildup by turning off power consuming (and heat generating) components at times when a threshold heat is exhibited by the imaging device 100. More details regarding the selective adjustment of the channels will be provided further below.

The control circuitry 106 may be embodied as any circuit or circuits configured to perform the functions described herein. For example, the control circuitry 106 may be embodied as or otherwise include an application specific integrated circuit (ASIC), a field programmable gate array (FPGA), a system-on-a-chip, a processor and memory, a voltage source, a current source, one or more amplifiers, one or more digital-to-analog converters, one or more analog-to-digital converters, etc.

The illustrative computing device 112 may be embodied as any suitable computing device including any suitable components, such as a processor, memory, communication circuitry, battery, display, etc. In one embodiment, the computing device 112 may be integrated with the control circuitry 106, transducers 102, etc., into a single package or single chip, or a single system on a chip (SoC), as suggested for example in the embodiment of FIG. 1. In other embodiments, some or all of the computing devices may be in a separate package from the control circuitry, and the transducers, etc., as suggested for example in the embodiment of in FIG. 2 as will be described in further detail below.

Each transducer element may have any suitable shape such as, square, rectangle, ellipse, or circle. The transducer elements may be arranged in a two dimensional array arranged in orthogonal directions, such as in N columns and M rows as noted herein, or may be arranged in an asymmetric (or staggered) rectilinear array.

Transducer elements 104 may have associated transmit driver circuits of associated transmit channels, and low noise amplifiers of associated receive channels. Thus, a transmit channel may include transmit drivers, and a receive channel may include one or more low noise amplifiers. For example, although not explicitly shown, the transmit and receive channels may each include multiplexing and address control circuitry to enable specific transducer elements and sets of transducer elements to be activated, deactivated or put in low power mode. It is understood that transducers may be arranged in patterns other than orthogonal rows and columns, such as in a circular fashion, or in other patterns based on the ranges of ultrasonic waveforms to be generated therefrom.

Figure 2:
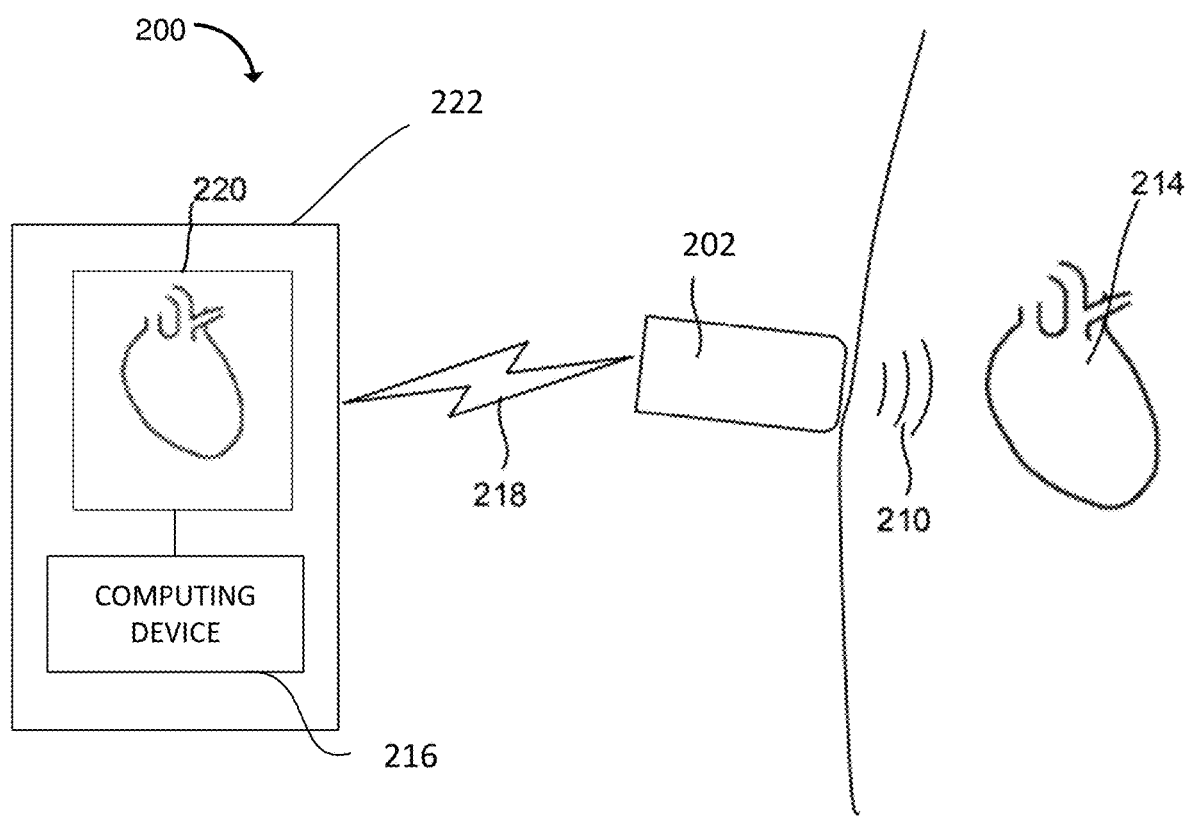
FIG. 2 is a diagram of an imaging system with selectively alterable characteristics, in accordance with disclosed embodiments.

FIG. 2 is a diagram of an imaging environment including an imaging system with selectively configurable characteristics, according to an embodiment. The imaging system of FIG. 2 may include an imaging device 202 and a computing system 222 which includes a computing device 216 and a display 220 coupled to the computing device, as will be described in further detail below.

As depicted in FIG. 2, the computing device 216 may, according to one embodiment, and unlike the embodiment of FIG. 1, be physically separate from the imaging device 220. For example, the computing device 216 and display device 220 may be disposed within a separate device (in this context, the shown computing system 222, physically separate from imaging device 202 during operation) as compared with the components of the imaging device 202. The computing system 222 may include a mobile device, such as cell phone or tablet, or a stationary computing device, which can display images to a user. In another example, as shown in FIG. 1 for example, the display device, the computing device, and associated display, may be part of the imaging device 202 (now shown). That is, the imaging device 100, computing device 216, and display device 220 may be disposed within a single housing.

A "computing device" as referred to herein may, in some embodiments, be configured to generate signals to cause an image of the object to be displayed on a display. The generation of the signals may include, in some embodiments, implementing an interlacing algorithm as will be described further below.

As depicted, the imaging system includes the imaging device 202 that is configured to generate and transmit, via the transmit channels (FIG. 1, 108), pressure waves 210 toward an object, such as a heart 214, in a transmit mode/process. The internal organ, or other object to be imaged, may reflect a portion of the pressure waves 210 toward the imaging device 202 which may receive, via a transducer (such as transducer 102 of FIG. 1), receive channels (FIG. 1, 110), control circuitry (FIG. 1, 106), the reflected pressure waves. The transducer may generate an electrical signal based on the received ultrasonic energy in a receive mode/process. A transmit mode or receive mode may be applicable in the context of imaging devices that may be configured to either transmit or receive, but at different times. However, as noted previously, some imaging devices according to embodiments may be adapted to be in both a transmit mode and a receive mode simultaneously. The system also includes a computing device 216 that is to communicate with the imaging device 100 through a communication channel, such as a wireless communication channel 218 as shown, although embodiments also encompass within their scope wired communication between a computing system and imaging device. The imaging device 100 may communicate signals to the computing device 216 which may have one or more processors to process the received signals to complete formation of an image of the object. A display device 220 of the computing system 222 may then display images of the object using the signals from the computing device.

An imaging device according to some embodiments may include a portable device, and/or a handheld device that is adapted to communicate signals through a communication channel, either wirelessly (using a wireless communication protocol, such as an IEEE 802.11 or Wi-Fi protocol, a Bluetooth protocol, including Bluetooth Low Energy, a mmWave communication protocol, or any other wireless communication protocol as would be within the knowledge of a skilled person) or via a wired connection such as a cable (such as USB2, USB 3, USB 3.1, and USB-C) or such as interconnects on a microelectronic device, with the computing device. In the case of a tethered or wired, connection, the imaging device may include a port as will be described in further detail in the context of FIG. 3A for receiving a cable connection of a cable that is to communicate with the computing device. In the case of a wireless connection, the imaging device 100 may include a wireless transceiver to communicate with the computing device 216.

It should be appreciated that, in various embodiments, different aspects of the disclosure may be performed in different components. For example, in one embodiment, the imaging device may include circuitry (such as the channels) to cause ultrasound waveforms to be sent and received through its transducers, while the computing device may be adapted to control such circuitry to the generate ultrasound waveforms at the transducer elements of the imaging device using voltage signals, and further a processing of the received ultrasonic energy to derive an image of the object therefrom. In such an embodiment, the computing device may manage/control power usage by the imaging device, may construct images of the object using frames as discussed in more detail below, may select and configure transmit and receive channels, etc.

In another embodiment, the imaging device may include control circuitry to control a generation of the ultrasound waveforms at the transducer elements using voltage signals in order to cause the ultrasound waveform to be sent and received from the transducer elements, and may also generate electrical signals from the received ultrasound energy and to construct images of the object therefrom using frames as discussed in more detail below. In such an embodiment, the control circuitry of the imaging device may send the constructed frames to the computing device, which may simply forward them to a display without further processing. More generally, it should be appreciated that any suitable function disclosed herein may be performed by one or more circuitries, and that these circuitries may be housed in one physical device, or housed physically separately from each other, but communicatively coupled to one another.

Figure 3A:
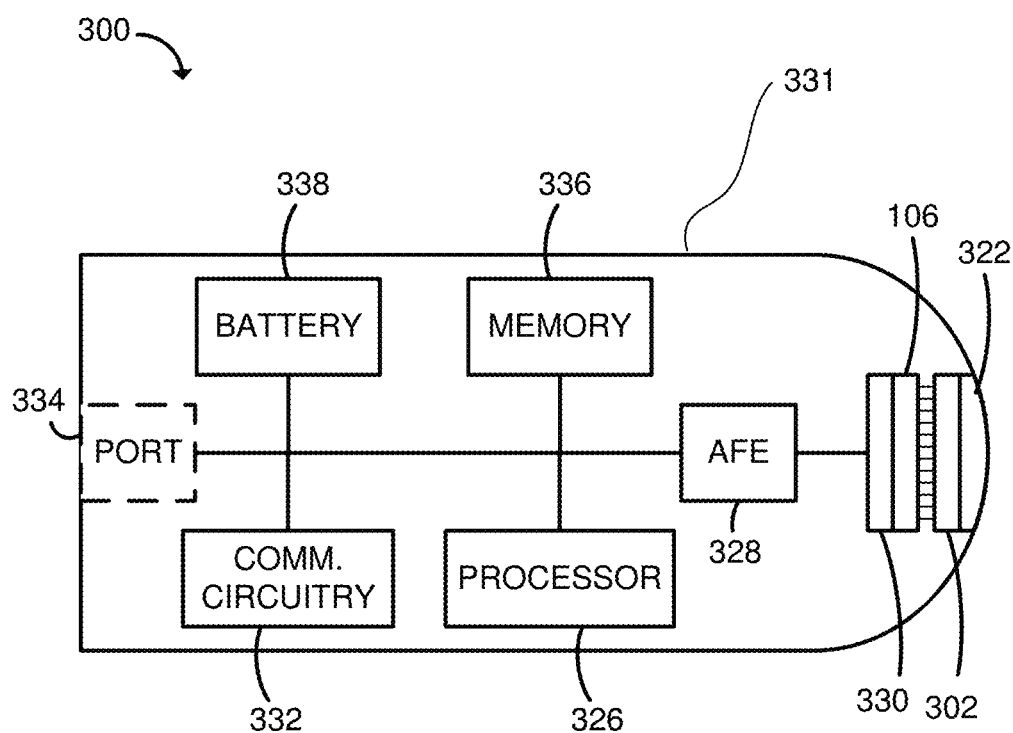
FIG. 3A is a schematic diagram of an imaging device with selectively alterable characteristics, in accordance with some disclosed embodiments.
Figure 3B:
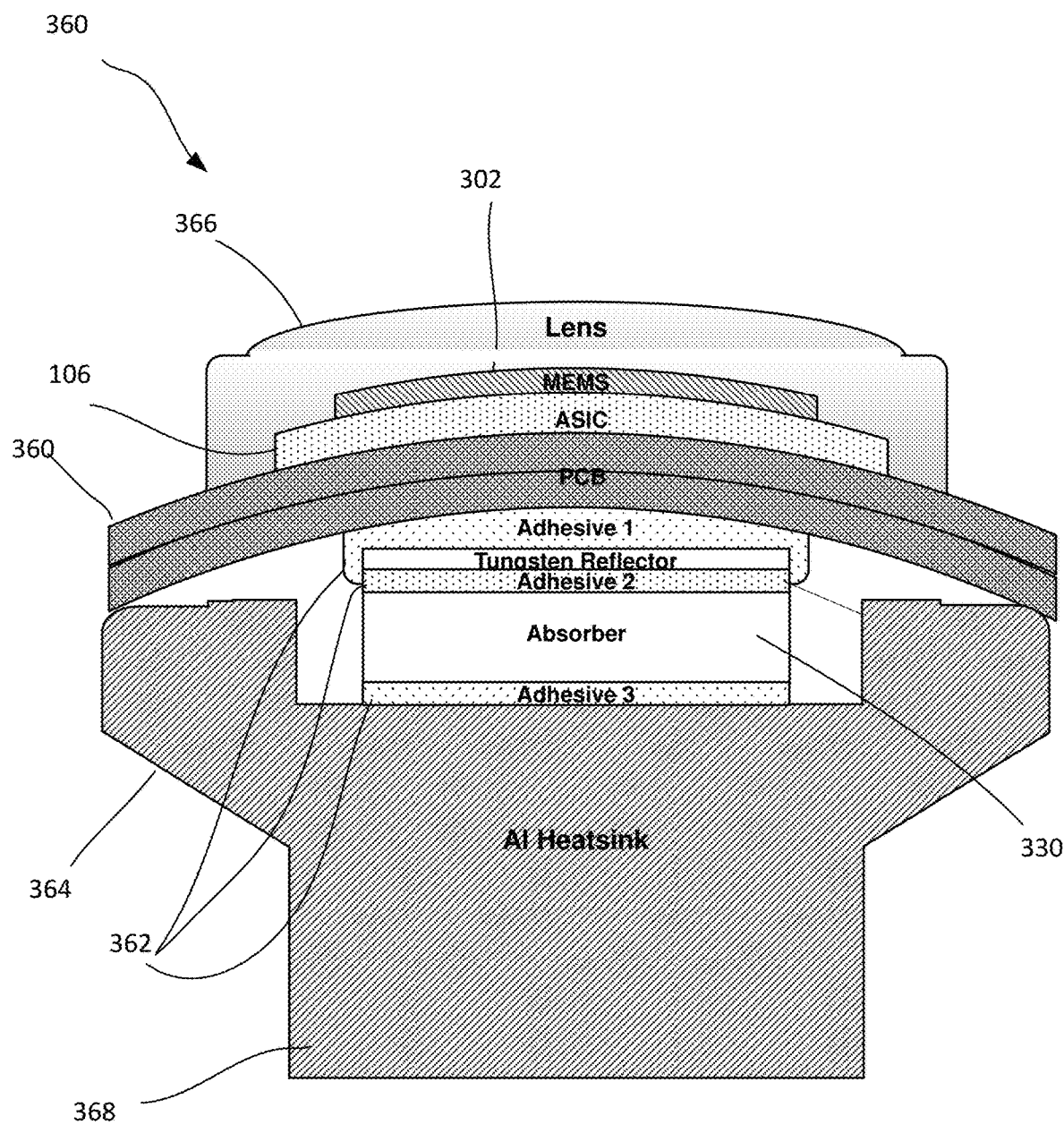
FIG. 3B is a schematic diagram of internal components of the imaging device of FIG. 3A according to one embodiment.

FIGS. 3A and 3B represent, respectively, views of an imaging device and of internal components within the housing of imaging device according to some embodiments, as will be described in further detail below.

As seen in FIG. 3A, the imaging device 300 may include a handheld casing 331 where transducers 302 and associated electronics are housed. The imaging device may also contain a battery 338 to power the electronics. The amount of power consumed by the imaging device, whether through a battery or by way of a wired or wireless connection, can increase the temperature of the imaging device. To ensure satisfactory use of the imaging device and imaging device performance, the temperature of the body of the imaging device may need to remain below a threshold temperature. The imaging device of the present specification may be electronically configured to reduce power and temperature notwithstanding the acquisition of high quality images which consumes significant amount of power, reduces battery life, and increases temperature in the probe (or imaging device).

FIG. 3A thus shows an embodiment of a high performance, low power, and low cost portable imaging device capable of 2D and 3D imaging using pMUTs in a 2D array, optionally built on a silicon wafer. Such an array coupled to an application specific integrated circuit (ASIC) 106 with electronic configuration of certain parameters, enables a higher quality of image processing at a low cost than has been previously possible. Further by controlling certain parameters, for example the number of channels used, power consumption can be altered and temperature can be changed.

The imaging device 300 according to some embodiments is configured to allow system configurability and adaptability in real time to actively control power consumption and temperature in the imaging device. This is done by minimizing power dissipation within the imaging device by 1) altering the number of channels and/or 2) actively controlling power dissipation in those channels such that temperatures within the imaging device do not exceed specification limits.

Now addressing FIG. 3A in more detail, FIG. 3A is a schematic diagram of an imaging device 300 with selectively adjustable features, according to some embodiments. The imaging device 300 may be similar to imaging device 100 of FIG. 1, or to imaging device 202 of FIG. 2, by way of example only. As described above, the imaging device may include an ultrasonic medical probe. FIG. 3A depicts transducer(s) 302 of the imaging device 300. As described above, the transducer(s) 302 may include arrays of transducer elements (FIG. 1, 104) that are adapted to transmit and receive pressure waves (FIG. 2, 210). In some examples, the imaging device 300 may include a coating layer 322 that serves as an impedance matching interface between the transducers 302 and the human body, or other mass or tissue through which the pressure waves (FIG. 2, 210) are transmitted. In some cases, the coating layer 322 may serve as a lens when designed with the curvature consistent with focal length desired.

The imaging device 300 may be embodied in any suitable form factor. In some embodiments, part of the imaging device 300 that includes the transducers 302 may extend outward from the rest of the imaging device 100. The imaging device 300 may be embodied as any suitable ultrasonic medical probe, such as a convex array probe, a micro-convex array probe, a linear array probe, an endovaginal probe, endorectal probe, a surgical probe, an intraoperative probe, etc.

In some embodiments, the user may apply gel on the skin of a living body before a direct contact with the coating layer 322 so that the impedance matching at the interface between the coating layer 322 and the human body may be improved. Impedance matching reduces the loss of the pressure waves (FIG. 2, 210) at the interface and the loss of the reflected wave travelling toward the imaging device 300 at the interface.

In some examples, the coating layer 322 may be a flat layer to maximize transmission of acoustic signals from the transducer(s) 102 to the body and vice versa. The thickness of the coating layer 322 may be a quarter wavelength of the pressure wave (FIG. 2, 210) to be generated at the transducer(s) 102.

The imaging device 300 also includes a control circuitry 106, such as one or more processors, optionally in the form of an application-specific integrated circuit (ASIC chip or ASIC), for controlling the transducers 102. The control circuitry 106 may be coupled to the transducers 102, such as by way of bumps. As described above, the transmit channels 108 and receive channels 110 may be selectively alterable or adjustable, meaning that the quantity of transmit channels 108 and receive channels 110 that are active at a given time may be altered such that the power consumption characteristics of the transmit channels 108 and receive channels 110 may be controlled as a result. For example, it may be the case that the channels that are selectively altered are receive channels (FIG. 1, 110) that are powered down or set to a lower power state. The receive channels (FIG. 1, 110) include various components to receive the reflected pressure waves (FIG. 2, 210) and condition the signals (amplify, combine, process, etc.). These components consume power and accordingly, by powering down the receive channel (FIG. 1, 110) or setting it to a lower power mode, these components draw less power and thus decrease their heat generation.

In another example, it may be that the transmit channels (FIG. 1, 108) are powered down or set to a lower power state. With specific regard to the transmit channels (FIG. 1, 108), the transmit channels (FIG. 1, 108) drive the elements (FIG. 1, 104) via a voltage pulse of a predetermined value, such as 15 volts (V) in one embodiment of a pMUT transducer element. In some examples, placing the transmit channels (FIG. 1, 108) in a lower power state may mean reducing the magnitude of the voltage pulse, such as to 5 V in one embodiment of a pMUT transducer element.

In some examples, the basis for altering the channels may be a mode of operation. For example, the imaging device may operate in a low-power mode that reduces power consumption while still maintaining a high image resolution. The resolution of an image may refer to the number of scanlines for a particular frame of an image, or it may refer to the number of frames generated per second. Accordingly, generating a higher-resolution image may require the use of more channels. For example, a high-resolution image may require all 128 receive channels (FIG. 1, 110) and all 128 transmit channels (FIG. 1, 108). However, a lower resolution image may be generated by activating just a subset of the receive channels (FIG. 1, 110) and the transmit channels (FIG. 1, 108), say, 64 of each. In some examples, the low power mode may refer to a mode wherein a user of the imaging device is searching for the particular object to be imaged and the high-power mode may refer to a mode wherein the object has been found by the user and high-resolution images of the object are desired. In this example, the number of channels (FIG. 1, 108, 110) are powered down or set to the low power state during the low-resolution portion.

Turning back to FIG. 3A, the imaging device may also include one or more processors 326 for controlling the components of the imaging device 100. One or more processors 326 may be configured to, in addition to control circuitry 106, at least one of control an activation of transducer elements, process electrical signals based on reflected ultrasonic waveforms from the transducer elements or generate signals to cause a restoration of an image of an object being imaged by one or more processors of a computing device, such as computing device 112 of FIG. 1 or 216 of FIG. 2. One or more processors 326 may further be adapted to perform other processing functions associated with the imaging device. The one or more processors 326 may be embodied as any type of processors 326. For example, the one or more processors 326 may be embodied as a single or multi-core processor(s), a single or multi-socket processor, a digital signal processor, a graphics processor, a neural network compute engine, an image processor, a microcontroller, a field programmable gate array (FPGA), or other processor or processing/controlling circuit. The imaging device 100 may also include circuit(s) 328, such as Analog Front End (AFE), for processing/conditioning signals, and an acoustic absorber layer 330 for absorbing waves that are generated by the transducers 102 and propagated towards the circuits 328. That is, the transducer(s) 102 may be mounted on a substrate and may be attached to an acoustic absorber layer 330. This layer absorbs any ultrasonic signals that are emitted in the reverse direction (i.e., in a direction away from coating layer 322 in a direction toward port 334), which may otherwise be reflected and interfere with the quality of the image. While FIG. 3A depicts the acoustic absorber layer 330, this component may be omitted in cases where other components prevent a material transmission of ultrasound in the reverse direction. The analog front end 328 may be embodied as any circuit or circuits configured to interface with the control circuitry 106 and other components of the imaging device, such as the processor 326. For example, the analog front end 328 may include, e.g., one or more digital-to-analog converters, one or more analog-to-digital converters, one or more amplifiers, etc.

The imaging device may include a communication unit 332 for communicating data, including control signals, with an external device, such as the computing device (FIG. 2, 216), through for example a port 334 or a wireless transceiver. The imaging device 100 may include memory 336 for storing data. The memory 336 may be embodied as any type of volatile or non-volatile memory or data storage capable of performing the functions described herein. In operation, the memory 336 may store various data and software used during operation of the imaging device 100 such as operating systems, applications, programs, libraries, and drivers.

In some examples, the imaging device 100 may include a battery 338 for providing electrical power to the components of the imaging device 100. The selectable alteration of the channels may have a particularly relevant impact when the imaging device 100 includes a battery 338. For example, as the receive channels (FIG. 1, 110) and transmit channels (FIG. 1, 108) include components that draw power, the battery depletes over time. The consumption of power by these components in some examples may be rather large such that the battery 338 would drain in a short amount of time. This is particularly relevant when obtaining high quality images which consume significant amounts of power. The battery 338 may also include battery charging circuits which may be wireless or wired charging circuits (not shown). The imaging device may include a gauge that indicates a battery charge consumed and is used to configure the imaging device to optimize power management for improved battery life. Additionally or alternatively, in some embodiments, the imaging device may be powered by an external power source, such as by plugging the imaging device into a wall outlet.

Referring now to FIG. 3B, a more detailed view is shown of the internal components 360 within the housing of the imaging device 300 of FIG. 3A, minus the coating layer 322. The front portion 360 may, in the shown example of FIG. 3B, include a lens 366, below which lies the microelectromechanical (MEMs) transducer(s) 302, coupled to ASIC 106 as shown. The ASIC is in turn coupled to a printed circuit board (PCB) which may include some or all electronic components of the imaging device, such as battery 338, memory 336, communication circuitry 332 and processor 326, along with AFE 328 and port 334 of FIG. 3A. The assembly including the lens 366, transducer(s) 302, ASIC 106 and PCB 360 may rest on a series of layers including one or more adhesive layers 362, an absorber 330, and a reflector, such as a tungsten reflector.

It should be appreciated that, in some embodiments, various components of the imaging device as shown in FIGS. 3A and 3B may be omitted from an imaging device, or may be included in other components separate from the imaging device. For example, in one embodiment, the one or more processors 326 may include some or all of the control circuitry 106. Additionally or alternatively, some or all of the components may be integrated into or form part of a system-on-a-chip (SoC) or multichip package.

Figure 4:
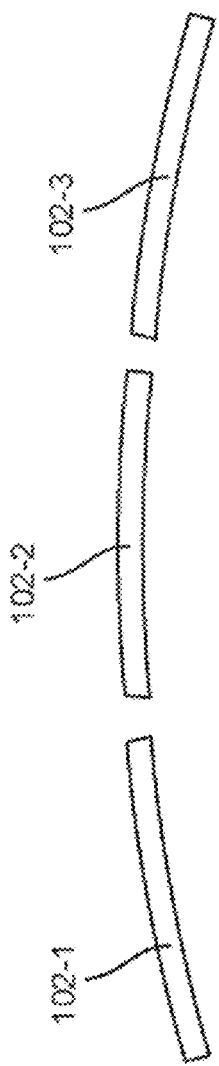
FIG. 4 is a side view of a curved transducer array, according to an example of the principles described herein.

FIG. 4 is a side view of a transducer 102 array, according to an example of the principles described herein. As described above, the imaging device (FIG. 1, 100) may include an array of transducers 102-1, 102-2, 102-3, each with their own array of transducer elements (FIG. 1, 104). In some examples, the transducers 102 may be curved (as suggested for example in FIG. 3B) so as to provide a wider angle of the object (FIG. 2, 214) to be imaged.

Figure 5:
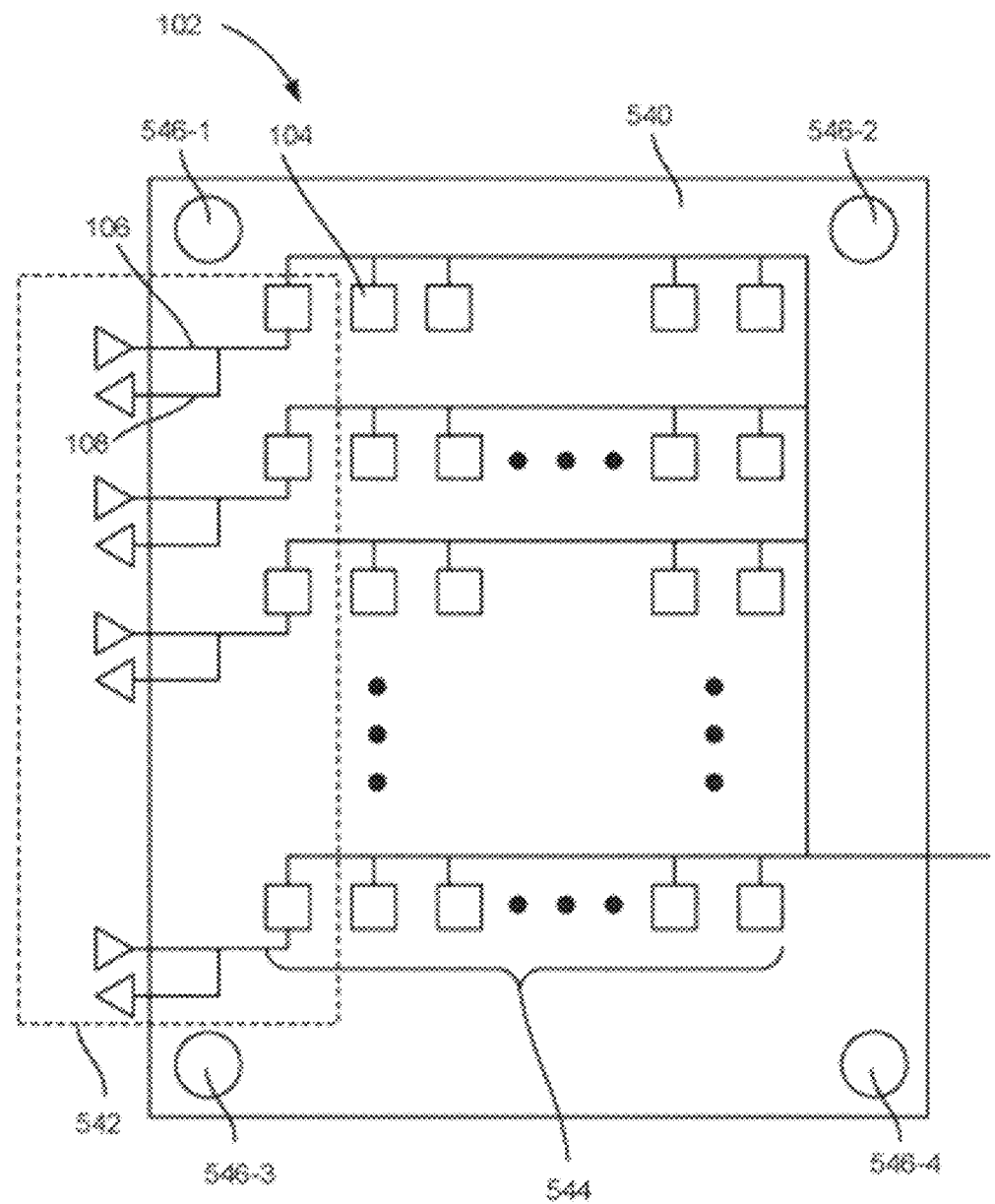
FIG. 5 is a top view of a transducer, according to an example of the principles described herein.

FIG. 5 depicts a top view of a single transducer 102. As depicted in FIG. 5, the transducer 102 may include a transceiver substrate 540 and one or more transducer elements 104 arranged thereon. Unlike the conventional systems that use bulk transducer elements, the transducer element 104 may be formed on a wafer and the wafer may be diced to form multiple transducers 102. This process may reduce the manufacturing cost since the transducers 102 may be fabricated in high volume and at low cost.

In some examples, the diameter of the wafer may range between 8~12 inches and many transducer element 104 arrays may be batch manufactured thereon. Furthermore, in some examples, the control circuitry (FIG. 1, 106) for controlling the transducer elements 104 may be formed such that each transducer element 104 is connected to the matching integrated circuits, e.g., receive channels (FIG. 1, 108) and transmit channels (FIG. 1, 106) in close proximity, preferably within 25 µm-100 µm. For example, the transducer 102 may have 1024 transducer elements 104 and be connected to a matching control circuitry (FIG. 1, 106) that has the appropriate number of transmit and receive circuits for the 1,024 transducer elements 104.

A transducer element 104 may have any suitable shape such as, square, rectangle, ellipse, or circle. As depicted in FIG. 5, in some examples, the transducer elements 104 may be arranged in a two dimensional array arranged in orthogonal directions. That is, the transducer element 104 array may be an M×N array with N columns 542 and M rows 544.

To create a line element, a column 542 of N transducer elements 104 may be connected electrically in parallel. Then, this line element may provide transmission and reception of ultrasonic signals similar to those achieved by a continuous transducer element that is almost N times longer than each transducer element 104. This line element may be called a column or line or line element interchangeably. An example of a column of piezo element is shown in FIG. 5 by the reference number 542. Transducer elements 104 are arranged in a column 542 in this example and have associated transmit driver circuits (part of transmit channel) and low noise amplifiers which are part of the receive channel circuitry.

Although not explicitly shown, the transmit and receive circuitry may include multiplexing and address control circuitry to enable specific elements and sets of elements to be used. It is understood that transducers 102 may be arranged in other shape such as circular, or other shapes. In some examples, each transducer elements 104 may be spaced 250 µm from each other center to center.

In the transducer 102 of the present specification, it is advantageous to design a line element using a plurality of identical transducer elements 104, where each element may have its characteristic center frequency. When a plurality of the transducer elements 104 are connected together, the composite structure (i.e. the line element) may act as one line element with a center frequency that consists of the center frequencies of all the element pixels. In modern semiconductor processes, these center frequencies match well to each other and have a very small deviation from the center frequency of the line element it is also possible to mix several pixels of somewhat different center frequencies to create a wide bandwidth line compared to lines using only one central frequency.

In some examples, the transducers 102 may include one or more temperature sensors 546-1, 546-2, 546-3, 546-4 to measure the temperature of the transducer 102. While FIG. 5 depicts temperature sensors 546 disposed at particular locations, the temperature sensors 546 may be disposed at other locations on the transducer 102 and additional sensors may be disposed at other locations on the imaging device (FIG. 1, 100).

The temperature sensors 546 may, according to one embodiment, trigger the selective adjustment of channels (FIG. 1, 108, 110). That is, as described above, temperatures within a handheld portable imaging device (FIG. 1, 100) may rise above a predetermined temperature. Accordingly, the temperature sensors 546 may detect a temperature of the device at the transducer 102 surface, which is a surface that contacts a patient if the temperature sensors 546 detect a temperature greater than a threshold amount, for example a user-established temperature or a temperature set by a regulatory authority, a signal may be passed by the controller (FIG. 3, 324) to power down all or some of the transmit channels (FIG. 1, 108) and/or receive channels (FIG. 1, 110) or to set all or some of the transmit channels (FIG. 1, 108) and/or receive channels (FIG. 1, 110) in a low power state. Placing the temperature sensor 546 on the transducers 102 is beneficial in that this is near the surface that contacts the patient and is therefore provides data regarding the temperature at the interface where a user may notice, or be affected by excess heat.

FIG. 5 also depicts the terminals of the transducer elements 104. That is, each transducer element 104 may have two terminals. A first terminal may be a common terminal shared by all transducer elements 104 in the array. The second terminal may connect the transducer elements 104 to the transmit channels (FIG. 1, 108) and receive channels (FIG. 1, 110). This second terminal may be the terminal that is driven and sensed for every transducer element 104 as shown symbolically for those transducer elements 104 in the first column. For simplicity, the second terminal is only indicated for those transducer elements 104 in the first column. However, similar terminals with the associated transmit channels 108 and receive channels 110 populate the other transducer elements 104 in the array. The control circuitry (FIG. 1, 106) using control signals can select a column 542 of transducer elements 104 by turning on respective transmit channels (FIG. 1, 108) and receive channels (FIG. 1, 110) and turning off the channels (FIG. 1, 108, 110) in other columns 542. In a similar manner, it is also possible to turn off particular rows, or even individual, transducer elements 104.

Figure 6:
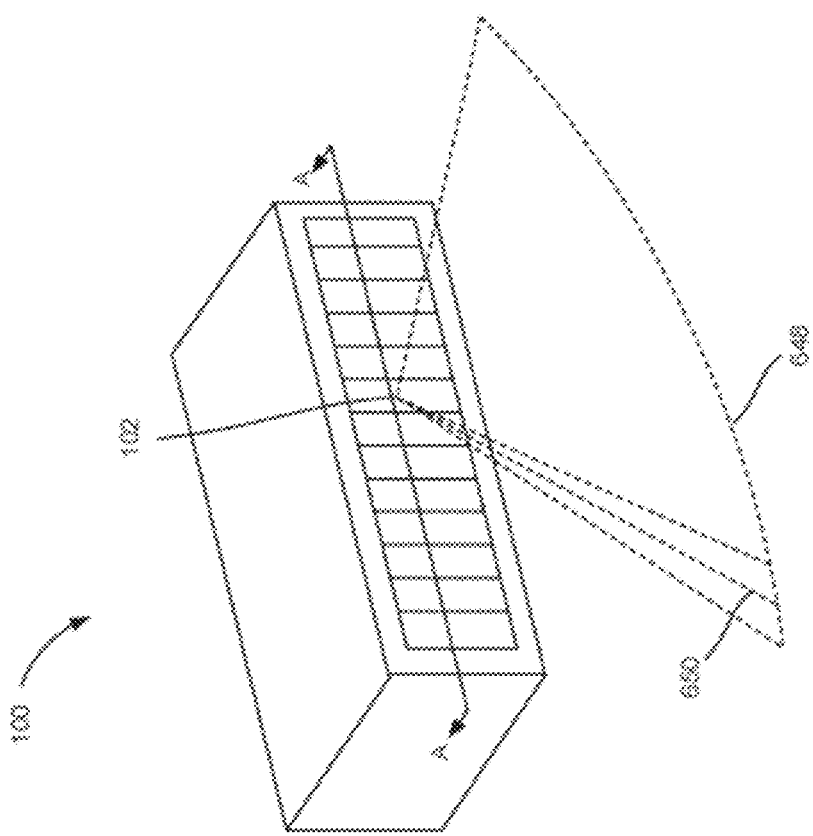
FIG. 6 is an isometric view of an imaging device and scan lines of a frame, according to an example of the principles described herein.

FIG. 6 is an isometric view of an imaging device 100 and scan lines 650 of a frame 648, according to an example of the principles described herein. A frame 648 refers to a single still image of an organ, or other object to be imaged. The frame 648 may correspond to an image of a cross-sectional plane through the object. A frame 648 is made up of individual scan lines 650. That is, a frame 648 may be viewed as an image, and a scan line is an individual layer or slice of that image. Depending on the resolution, a particular frame 648 may include different numbers of scan lines 650 ranging from less than a hundred to many hundreds.

To form a frame 648, a transducer 102, using beamforming circuitry, may focus pressure waves of different transducer elements (FIG. 1,104), for example, those in a particular column (FIG. 5, 542) to a particular focal point. The reflected signals collected by these transducer elements (FIG. 1, 104) are received, delayed, weighted, and summed to form a scan line 650. The focal point of interest may then be changed based on beam-forming technology, and the process repeated until an entire frame 648, consisting of for example 100-200 scan lines 650 is generated.

Figure 7:
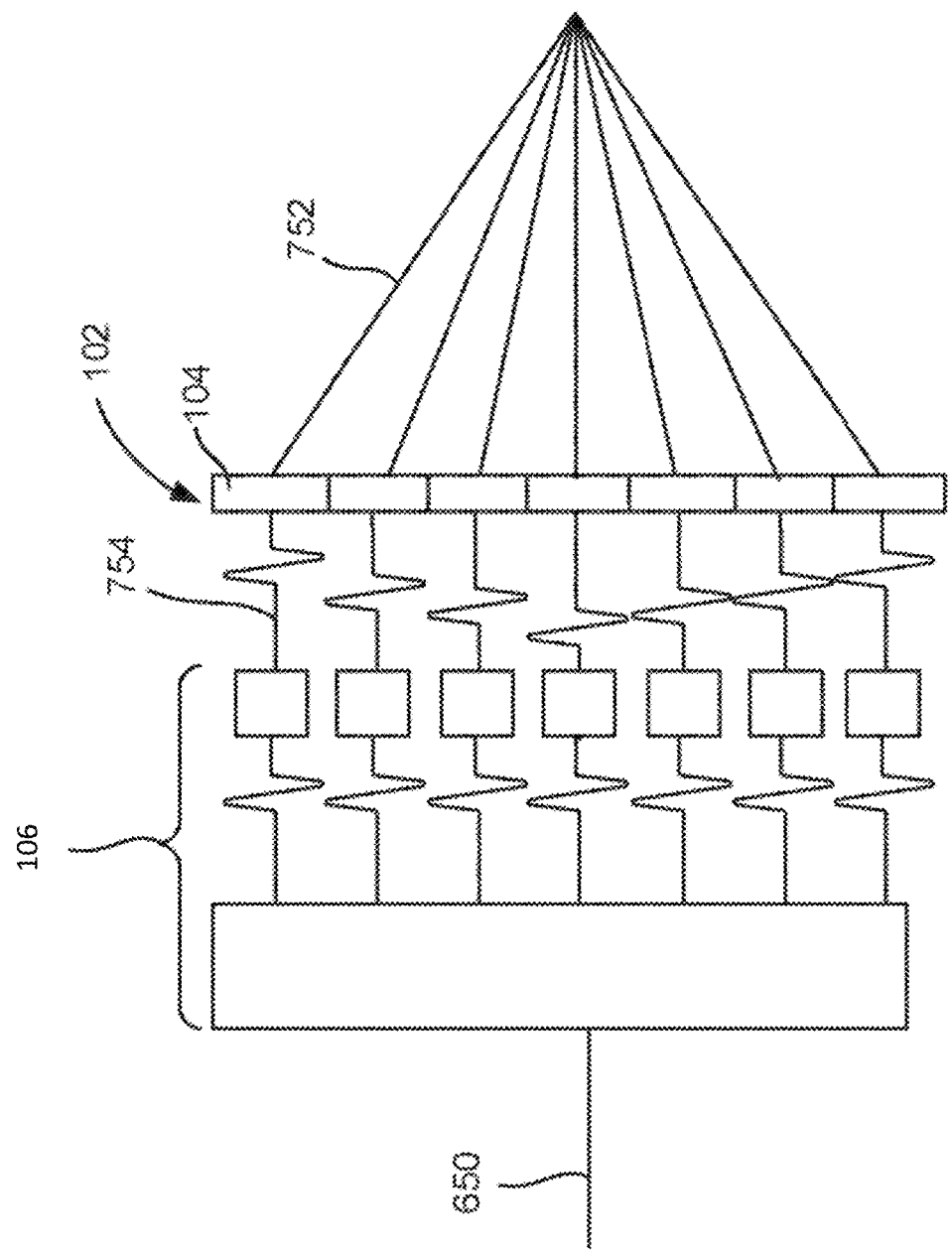
FIG. 7 illustrates the formation of a scan line, according to an example of the principles described herein.

FIG. 7 illustrates the formation of a scan line 850, according to an example of the principles described herein. Specifically, FIG. 7 is a cross-sectional view of one transducer 102 taken along the line A-A from FIG. 6. Specifically, FIG. 7 depicts the transducer elements 104 that make up the transducer 102. In FIG. 7, just one transducer element 104 of a transducer 102 is indicated with a reference number for simplicity. Moreover, note that the transducer elements 104 depicted in FIG. 7 may represent a top transducer element 104 of a column (FIG. 5, 542) with other transducer elements 104 extending into the page. FIG. 7 also depicts circuitry that may be found in the control circuitry (FIG. 1, 106 or FIG. 3, 106) to form a scan line. Note also that for simplicity FIG. 7 only depicts seven transducer elements 104, and seven respective columns (FIG. 5, 542). However as described above, a transducer 102 may include any number of transducer elements 104, for example, 128 columns (FIG. 5, 542), with each column (FIG. 5, 542) having 32 transducer elements 104 disposed therein.

To form a scan line 650, reflected ultrasonic waveforms 752 are received from a number of transducer elements 104, for example from each transducer element 104 in a column (FIG. 5, 542). These waveforms 752 are converted into electrical signals. In some examples, electrical signals from transducer elements 104 in a column (FIG. 5, 542) may be combined into a composite signal 754 which is passed to the control circuitry 106. As each composite signal 754 is received at a different time due to different transmission lengths, the control circuitry 106 delays each composite signal 754 such that they are in phase. The control circuitry 106 then combines the adjusted signals to form a scan line 650.

As described above, a frame (FIG. 6, 648) of an image is formed of many scan lines 650, often 128 or more. These scan lines 650 cover the area to be imaged. The time to collect and combine the scan lines 650 into a frame (FIG. 648) defines the quality of the video, in terms of the frame rate, of an object to be imaged. For example, assuming the example of scanning a heart, and assuming the heart is 20 cm below the transducer 102 surface, an ultrasound waveform takes approximately 130 microseconds (p s) to travel to the heart, assuming sound travels at 1540 m/s in tissue. The signal is then reflected from the heart and takes another approximately 130 microseconds to reach the transducers 102 for a total transit time of approximately 260 microseconds. Using N receive channels (FIG. 1, 110), for example 128 channels, one scan line 650 is formed by transmitting from 128 transmit channels (FIG. 1, 110) driving 128 columns (FIG. 5, 544) of transducer elements (FIG. 1, 104) and receiving from all 128 columns (FIG. 5, 544) and processing the signals as indicated in FIG. 7. Assuming 128 scan lines 650 per frame (FIG. 6, 648), the maximum frame rate is around 30 fps.

In some examples, 30 fps may be sufficient, for example with livers and kidneys. However, to image moving organs, such as a heart, a higher frame rate may be desired. Accordingly, the imaging device (FIG. 1, 100) may implement parallel beamforming where multiple scan lines 650 can be formed at the same time. As multiple scan lies 650 can be formed at a time, the effective frame rate may be increased. For example, if four scan lines 650 could be formed at the same time, then the effective frame rate may go up to 120 fps. Parallel beamforming may be performed at the FPGAs (FIG. 3, 326) of the imaging device (FIG. 1, 100).

In some examples, the selective powering down of receive and/or transmit channels (FIG. 1, 110, 110) may be effected by parallel beamforming operations. For example, using parallel beamforming a frame rate of 120 fps may be achievable. However, if 30 fps is good enough, the receive channels (FIG. 1, 110) can be enabled 174 of the time, cutting down power consumption by a factor of 4 or somewhat less than 4, taking into account some requirements that are not amenable to be completely shut down, but can be placed into a materially lower power state. For example, after a set of 4 scan lines are simultaneously collected, the receive channels (FIG. 1, 110) could be turned off for a period of time, and then turned on again to collect another 4 scan lines simultaneously.

Such techniques can reduce power consumption to for example around 3.3 times less than a starting power consumption value. In other words, the selective powering down of the receive channels (FIG. 1, 110) in an imaging device (FIG. 1, 100) that performs parallel beamforming powers down receive channels (FIG. 1, 110) for a portion of the time such that overall frame rate is maintained. Such an operation does not affect the image quality as imaging artifacts can be digitally corrected with operations that are not power intensive and that may even be executed in a display processor that is not located in the probe.

Some embodiments of algorithms for such digital correction of images are provided further below. Data from the imaging device (FIG. 1, 100) in the form of scan lines 650 can be transported to the computing device (FIG. 2, 216) unit in any manner, such as wirelessly, using a wired connection such as by way of a USB or other interface. This image processing can be done outside of the imaging device (FIG. 1, 100) where there are fewer restrictions on temperature rise. The amount of scaling is dependent upon the number of parallel beams that are transmitted and received. For example, the scaling may be smaller when using two parallel beams or larger when using 8 parallel beams.

Figure 8:
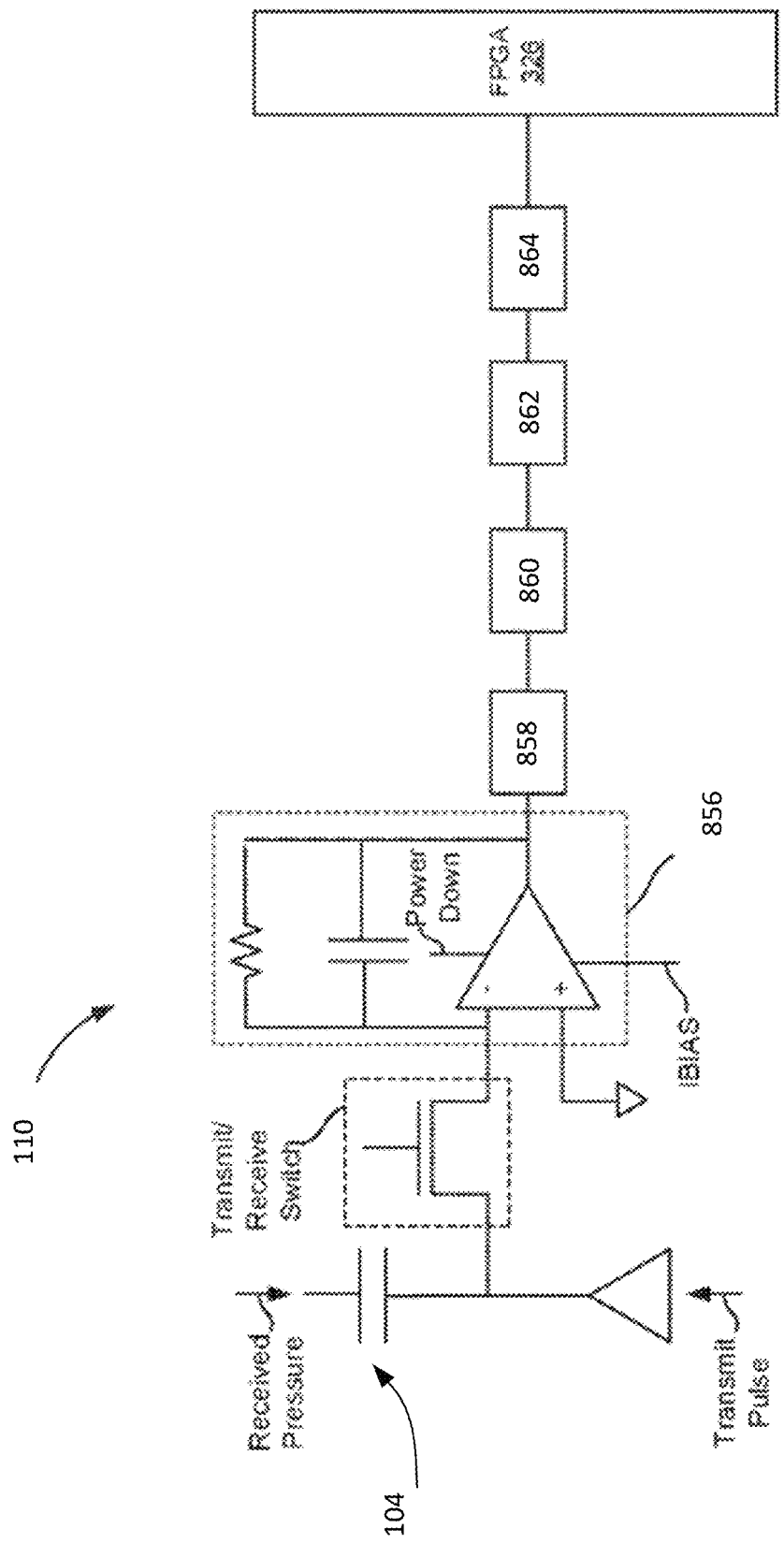
FIG. 8 depicts a receive channel, according to an example of the principles described herein.

FIG. 8 depicts a receive channel 110, according to an example of the principles described herein. The receive channel 110 is coupled to a transducer element (FIG. 1, 104) to receive the reflected pressure wave (FIG. 2, 210). FIG. 8 also depicts the connection between the transducer element (FIG. 1, 104) and the transmit channel (FIG. 1, 110). In one example, the transmit channel (FIG. 1, 108) goes towards a high impedance during a receive operation at the node where the received pressure and transmitted pulse meet. Specifically, the reflected pressure wave is converted to an electrical charge in the transducer element 104 and this is converted to a voltage by a low noise amplifier (LNA) (856). The LNA (856) is a charge amplifier, where charge is converted to an output voltage. In some examples, the LNA (856) has programmable gain, where the gain can be changed in real time.

The LNA (856) converts charge in the transducer to a voltage output and also amplifies the received echo signal. A switch (transmit/receive switch) connects the LNA (856) to the transducer element 104 in the receive mode of operation.

The output of this LNA (856) then is connected to other components to condition the signal. For example, a programmable gain amplifier (PGA) (858) adjusts the magnitude of the voltage and provides a way to change the gain as a function of time and may be known as a time gain amplifier (TGA). As the signal travels deeper into the tissue, it is attenuated.

Accordingly, a larger gain is used to compensate, which larger gain is implemented by the TGA. The bandpass filter 860 operates to filter out noise and out of band signals. An analog to digital converter (ADC) 862 digitizes the analog signal to convert the signal to the digital domain such that further processing can be done digitally. Data from the ADC 862 is then digitally processed at a demodulation unit 864 and passed to the FPGA 326 to generate the scan line (FIG. 6, 650) as depicted in FIG. 7. in some implementations, the demodulation unit 864 can be implemented elsewhere, for example in the FPGA. The demodulation unit frequency-shifts the carrier signal to baseband with two components in quadrature (I and Q), for further digital processing in some examples, the analog to digital converter (ADC) 862 may implement a successive-approximation-register (SAP) architecture to reduce latency of the ADC 862. That is, as the ADC 862 is turned off and on repeatedly, it needs to have little to no latency so as to not delay signal processing following turning on.

As described, components of the receive channel 110 may be turned off, or set to a lower power mode to conserve power. That is, significant amounts of power are consumed in the LNA 856, PGA 8058, ADC 862 and other digital processing components in one example, an imaging device (FIG. 1, 100) incldes 128 receive channels 110. The power consumption using all 128 receive channels 110 to produce a high number of scan lines (FIG. 8, 650) can cause a large amount of power consumption.

As one specific example, presume an LNA 856 consumes 1 mW, an ADC 862 consumes 40 mW, and demodulation, I/Q conversion consumes another 10 mW. In this example, each receive channel 110, not counting the power consumed by digital processing, consumes 60 mW. Incorporating the digital processing which is used to form scan lines (FIG. 6, 650) using a low power FPGA 326, for a 128 channel 110 implementation is around 12 W in the FPGA 326, of which around 9 W would be in computational matters and rest in overhead in I/O and static losses. Thus for 128 receive channels 110 power consumed will be in this example almost 20 W. Such a power level is technically impractical to support in a handheld imaging device (FIG. 1, 100). Power numbers in the less than 10 W are more reasonable power levels. Accordingly, by for example reducing the number of receive channels 110 by half results in a corresponding halving of the power consumed. The reduction in power not only improves battery life, but also affects the temperature of the imaging device (FIG. 1, 100). Note that while FIG. 8 depicts particular components in the receive channel 110, the receive channel 110 may include other components that may similarly be placed in low power or powered down states.

Other than changing the number of channels, other parameters can also be configured to materially reduce the power, such as shutting down (or lowering power) of all channels most of the time by using parallel beam forming to boost the frame rate and then shutting down circuits for time consistent to targeted frame rates.

Figure 9A:
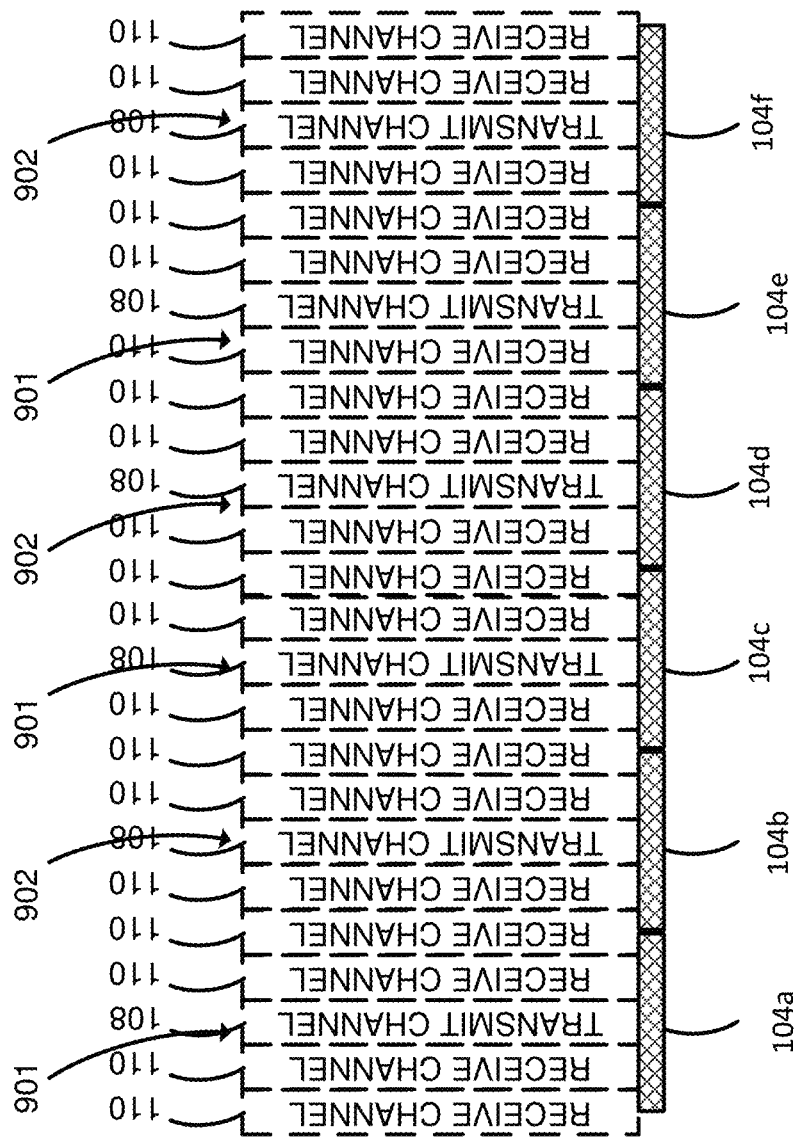
FIG. 9A illustrates a full scan configuration, in accordance with some disclosed embodiments.

Referring now to FIG. 9A, according to one embodiment, a schematic illustration of a number of transducer elements 104a, 104b, 104c, 104d, 104e and 104f is provided, along with their connection to transmit channels 108 or receive channel 110 as noted. The transmit channels 108 and receive channels 110 may be selectively activated to activate corresponding ones of the transducer elements for transmission or reception of ultrasonic waveforms, and they may further encompass a lesser number of transmit channels and/or receive channels than a number of transducer elements to be fired, hence the depiction of the transmit and receive channels in broken lines in FIG. 9A. Where a number of the transmit channels and/or receive channels is less than a number of transducer elements to be fired, a control circuitry and/or active components within a relevant one of the transmit and/or receive channel may cause the channel to address an intended one of the transducer elements in a selective manner (what we may refer to herein as functional coupling). Thus, according to some embodiments, control circuitry of the imaging device may cause a coupling of any transmitter channel and/or receiver channel to a selected transducer element based on an intended selective firing pattern of transducer elements. Thus, the depiction of the channels 108 and 110 in FIG. 9A is not to be interpreted as being limited to a scenario where every transducer element has a dedicated transmit channel, a plurality of physically proximate receive channels, but may be interpreted as encompassing a scenario where one or more transmit channels may be used to selectively address and drive a given transducer element, and a plurality of receive channels may be used to selectively address the given transducer element to process electrical signals therefrom generated based on the reflected ultrasound energy.

Referring still to FIG. 9A, for a frame at a first power (such as, for example, full power) the transducer elements 104a-104f may be activated (that is, they may be driven by a voltage pulse through a transmit channel coupled thereto to cause an ultrasonic waveform to be transmitted therefrom) in a one by one pattern in the time domain, in order to have each transducer element 104 transmit as driven by a transmit channel 108 connected thereto, and receive a reflected echo of ultrasound energy which would be converted to a voltage at the transducer and further processed through one or more of the receive channels 110, such as a cluster (in the shown embodiment 2-6 depending on which receive channels are activated to capture reflected ultrasound energy based on a transmission from a corresponding most recently activated transducer element. A next transducer element 104 may then be driven to transmit and receive in the same manner, and corresponding transmit channel 108 and receive channels 110 thereafter activated accordingly as explained above.

According to some embodiments, a transmit channel may be controlled to drive the transducer elements in different modes, such as in a linear mode or in a sector mode as will be explained below.

According to one embodiment, in a linear mode, a sequential firing of the transducer elements of FIG. 9A may involve a sequential firing where a firing mode of each successive transducer element generates an ultrasonic waveform in a direction that is substantially identical to a direction of an ultrasonic waveform transmitted by a most recently fired transducer element.

According to another embodiment, in a sector mode, a sequential firing of the transducer elements of FIG. 9A may involve a sequential firing where a firing mode of each successive transducer element may generate an ultrasonic waveform in a direction that may be different from a direction of an ultrasonic waveform transmitted by a most recently fired transducer element.

A firing of each transducer element may contribute to a scan line of a frame. A frame as used herein refers to a single still image of an object being imaged. The frame may correspond to a cross-sectional view through the object, and may be made up of individual scan lines. That is a frame may be viewed as an image, and a scan line is an individual slice of that image. Depending on the resolution of the image, a particular frame may include different numbers of scan lines ranging, for example, from less than a hundred to many hundreds.

To form a frame, a transducer, using beamforming circuitry, may focus pressure waves of different transducer elements, for example, those in a particular column, to a particular focal point of the object. The reflected ultrasonic energy collected by these transducer elements may be received by a given receive channel (Rx scan line), delayed, weighted, and summed to form a scan line. The focal point of interest is then changed based on beam-forming technology, and the process repeated until an entire frame, consisting of for example 100-200 scan lines is generated.

Figure 9B:
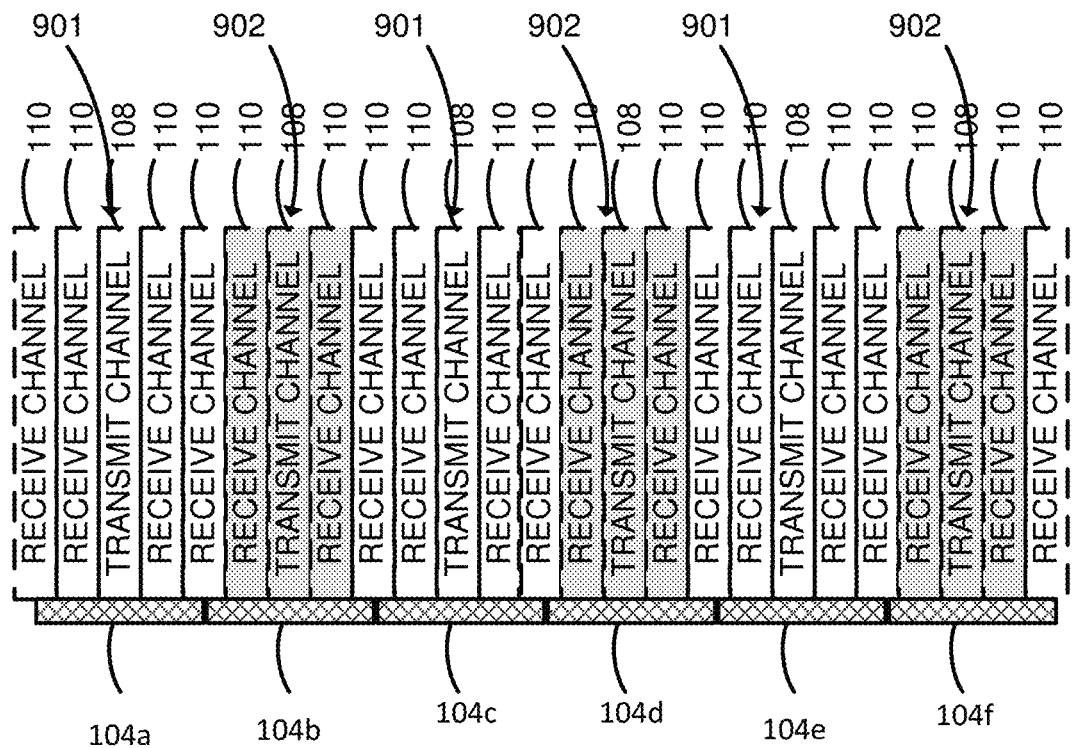
FIGS. 9B & 9C illustrate an interlaced scan configuration, in accordance with disclosed embodiments.
Figure 9C:
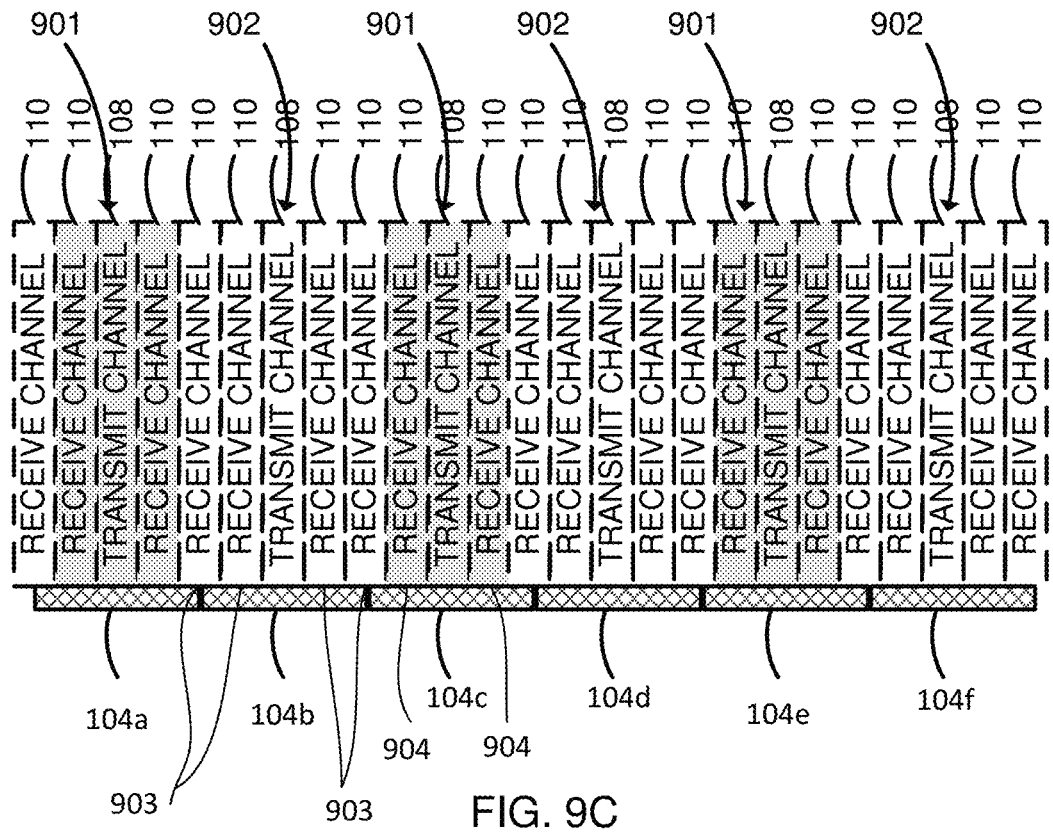

Referring now to FIGS. 9B & 9C, in some embodiments, reduced power consumption and heat generation may be achieved by alternating, to generate a frame, the spatial pattern of Tx firings in an interlaced fashion (alternating odd- and even-numbered Tx firings in the time domain).

By reducing the power consumption, or in some cases powering down the different channels completely, the battery 338 life may be extended, which enhances the ease of use of the imaging device and reduces the risk of overheating.

In the exemplary configuration illustrated in FIGS. 9B & 9C, an interlaced scan in a "(4, 2)" configuration is illustrated, in which there are 4 receive (Rx) scanlines per Tx channel (corresponding to 4 receive channels per Tx scan line), with 2 missing Rx scanlines in between. By a "missing scanline," what is meant in the instant disclosure is scanline that is missing because a corresponding channel is powered down/inactive. In FIGS. 9B and 9C, the missing scanlines corresponding to powered down channels, are shown as being shaded, whereas the active scanlines are unshaded. It should be apparent to those skilled in the art that other interlaced scan configurations are also possible, and within the scope of the disclosure, such as using 1-10 Rx scanlines per Tx line with 1-20 missing Rx scanlines in between.

Figure 10:
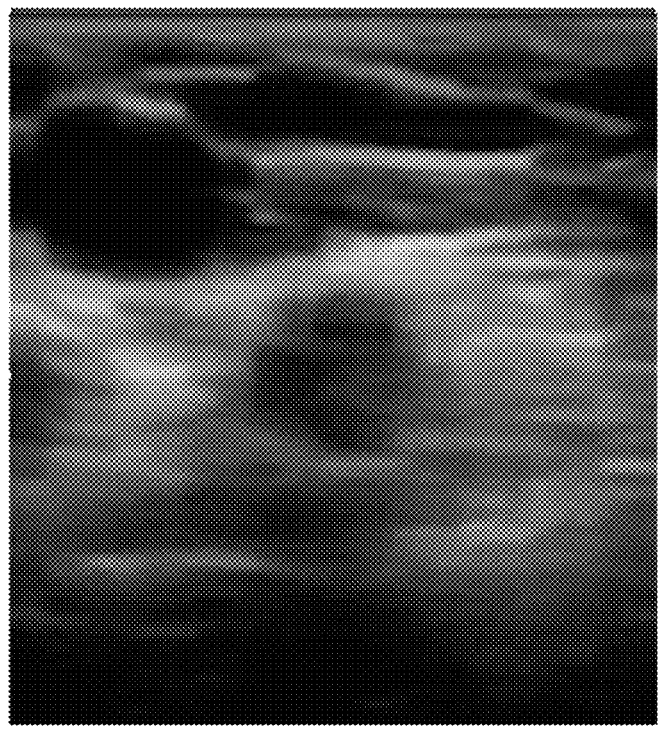
FIG. 10 illustrates an example conventional image frame from an ultrasound video created from interlaced data using intraframe interpolation to fill in the missing data.

As shown in FIG. 10, interlacing (not powering all available Rx channels during a firing of transducer elements thus resulting in missing scanlines) reduces the number of Rx scanlines, which reduces image quality if basic interpolation is used within each frame to fill in for the missing data, producing image artifacts that move about during an acquired ultrasound video. When viewed as a video, the artifacts in the intraframe interpolated imagery appear as distracting, moving patterns that are unacceptable.

Figure 11:
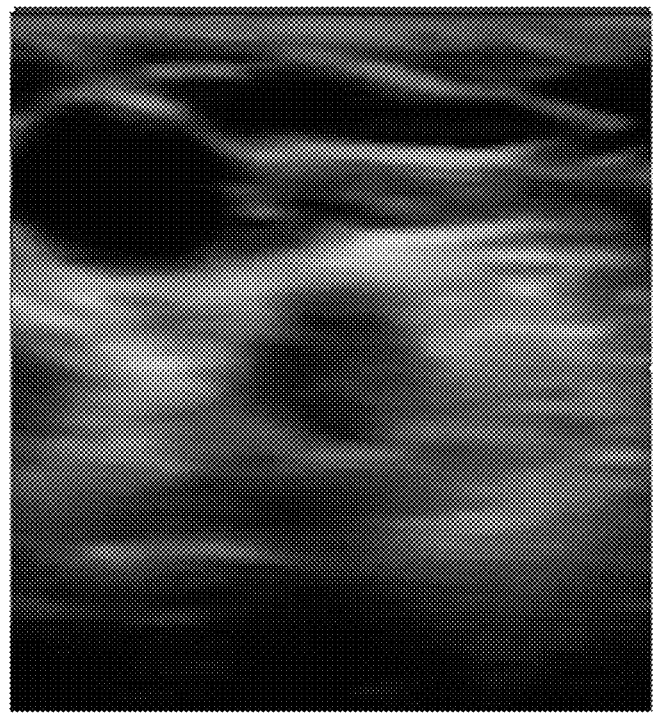
FIG. 11 illustrates an example image frame from an ultrasound video created from interlaced data using a reconstruction algorithm, in accordance with disclosed embodiments.

As shown in FIG. 11, in one embodiment, a reconstruction algorithm according to embodiments may be applied so that the image quality obtained from interlaced data is comparable to that obtained from non-interlaced data.

In an exemplary embodiment, the number of Tx firings is reduced by 50% in each frame, corresponding to a scanning procedure that is analogous to, but different from, the interlacing schemes used historically in video recording and display. However, it should be apparent to those skilled in the art that reductions greater or less than 50% are also possible and may be within the scope of the disclosure.

In traditional video interlacing, the image is represented using alternating frames, each containing only the odd- or even-numbered horizontal raster scanlines. Thus, in any given image frame, there is exactly one missing scanline between each pair of displayed scanlines.

In contrast, an ultrasound probe, such as an imaging device as described above, can measure multiple receive (Rx) scanlines per Tx firing. Therefore, a multiplicity of missing scanlines may exist between a multiplicity of acquired scanlines. Furthermore, some of the scanlines from one image frame may coincide with some of the scanlines in the next frame, whereas conventional video interlacing typically has no overlapping scanlines. In addition, the scanlines need not be uniformly spaced, as they are in traditional video interlacing.

FIGS. 9B and 9C illustrate an example interlaced scan configuration. In FIG. 9B, an odd frame includes a Tx firing by each odd transmit channel 108, with a group of four Rx scanlines 901 acquired for each Tx firing and a group of two missing Rx scanlines in between 902. As a result of the odd Tx firing, the imaging device may generate a partial frame, such as the odd partial frame 1202 discussed below in regard to FIG. 12. In FIG. 9C, an even frame includes a Tx firing by each even transmit channel 108, with a group of four Rx scanlines 903 acquired for each Tx firing and a group of two missing Rx scanlines in between 904. As a result of the even Tx firing, the imaging device may generate a partial frame, such as the even partial frame 1205 discussed below in regard to FIG. 12. Note that, in this particular configuration, the outermost Rx scanlines in the group of four Rx scanlines 901 are measured in both the even and even frames, while the innermost Rx scanlines are measured only in alternating frames. A (S, M) scan configuration is defined as one in which each Tx firing produces a group of S scanlines $\{r_1, r_2, \ldots, r_S\}$, with M missing scanlines between each group. Thus, the example shown in FIGS. 9A & 9B is denoted as a (4,2) configuration.

It should be appreciated that, in some embodiments, the imaging device may perform an interlaced scan in a different manner. For example, the imaging device may generate partial frames by activating a subset of transmit channels 108 other than the set of odd transmit channels 108 or the set of even transmit channels 110. For example, the imaging device may activate every third transmit channel 108, may activate two out of every three transmit channels 108, may activate transmit channels 108 in some other cyclic pattern, or may activate transmit channels 108 randomly or pseudo-randomly. After each partial frame is generated by activating some of the transmit channels 108, the imaging device can reconstruct the full frame by combining the partial frame with one or more previous full or partial frames, as discussed in more detail below.

Once the interlaced image frames are acquired, computing device 216 uses a reconstruction algorithm to process these interlaced frames ("reduced-power frames") to produce a collection of new image frames ("reconstructed frames") having image quality as close as possible to that which would be obtained by using all the Tx firings in every frame ("full-power frames").

The reconstruction algorithm will be described in this description using the example of 50% reduction in Tx power consumption using the (4,2) example as an illustration; however, reductions greater or less than 50% are also possible by choosing configurations other than (4,2) and by varying parameters such as the total number of Tx firings, as should be apparent to those skilled in the art.

Although the firing sequences above and algorithms to be described below have been described for the most part in the context of pMUTs and cMUTs, embodiments include within their scope the same firing sequences, receive channel activation sequences, and algorithms to be described below implemented in bulk PZT (i.e., "traditional") ultrasound probes. Embodiments further include within their scope the firing sequences, receive channel activation sequences, and algorithms below being used in any phased array application, including such applications for distance measurement (e.g. distance sensors for cars), in any phased power transmission, directional speakers, radar, etc.

Description of the Algorithm

The following description begins with a simplified explanation of the reconstruction algorithm and then proceeds to increasingly detailed descriptions. The reconstruction algorithm described in this section is designed specifically for linear mode imaging but can be adapted to work with sector mode imaging, Doppler flow imaging, and other modes of ultrasound imaging, as should be apparent to those skilled in the art.

High-Level Conceptual Overview of the Algorithm

Figure 12:
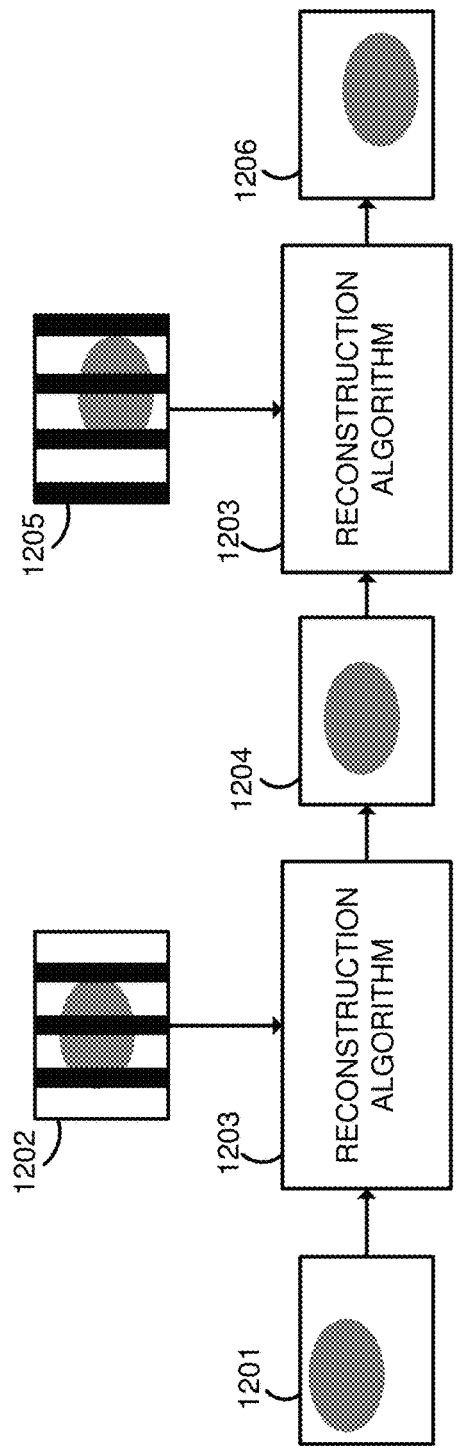
FIG. 12 illustrates a high-level block diagram of a reconstruction algorithm, in accordance with disclosed embodiments.

FIG. 12 shows a high-level block diagram of the reconstruction algorithm implemented in one embodiment of the present disclosure. Let n be an index that enumerates the frames (n=0, 1, 2 and so on) that are displayed for the user. Throughout a session of imaging of indefinite duration, the reconstruction algorithm includes repeated application of the series of operations shown in FIG. 12, wherein an image frame n−1 ("input frame") 1201 is used in conjunction with a reduced-power partial frame n 1202 to produce a reconstructed frame n 1204 based on a reconstruction algorithm 1203, and then the reconstructed frame n and a reduced-power partial frame n+1 1205 are used to obtain a reconstructed frame n+1 1206 using the reconstruction algorithm 1203. In FIG. 12, the reduced-power partial frames n and n+1 (1202 and 1205, respectively) are, for illustration purposes, described as odd and even frames, respectively. However, the reduced-power frames n and n+1 could alternatively be defined as even and odd frames, respectively. When n=0 (at the outset of imaging), in the illustrative embodiment, the input frame is a full-power frame, or alternatively an image produced from a reduced-power frame by interpolation using only information within that reduced-power frame. Thereafter, the input frame in FIG. 12 is the reconstructed frame that was the output of the previous iteration of the algorithm. Thus, the algorithm is recursive in nature, as depicted in FIG. 13.

Figure 13:
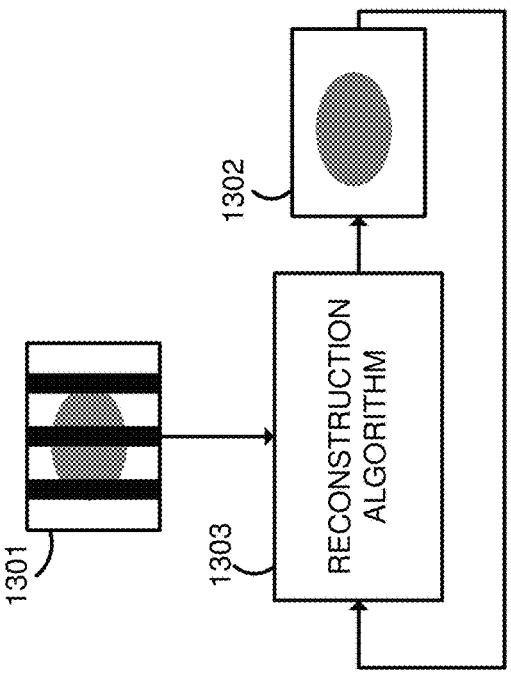
FIG. 13 illustrates the reconstruction algorithm depicted as a recursive procedure, in accordance with disclosed embodiments.

As illustrated in FIG. 13, in every iteration after the algorithm has been initialized (that is, in every iteration at n larger than or equal to 1, a reduced-power partial frame 1301 is used to update the reconstructed frame 1302, which is fed back into the reconstruction algorithm 1303 along with the next reduced-power partial frame 1301 to again update the reconstructed frame 1302 and so on. This recursive process takes place in real-time during the duration of an imaging session.

Figure 14:
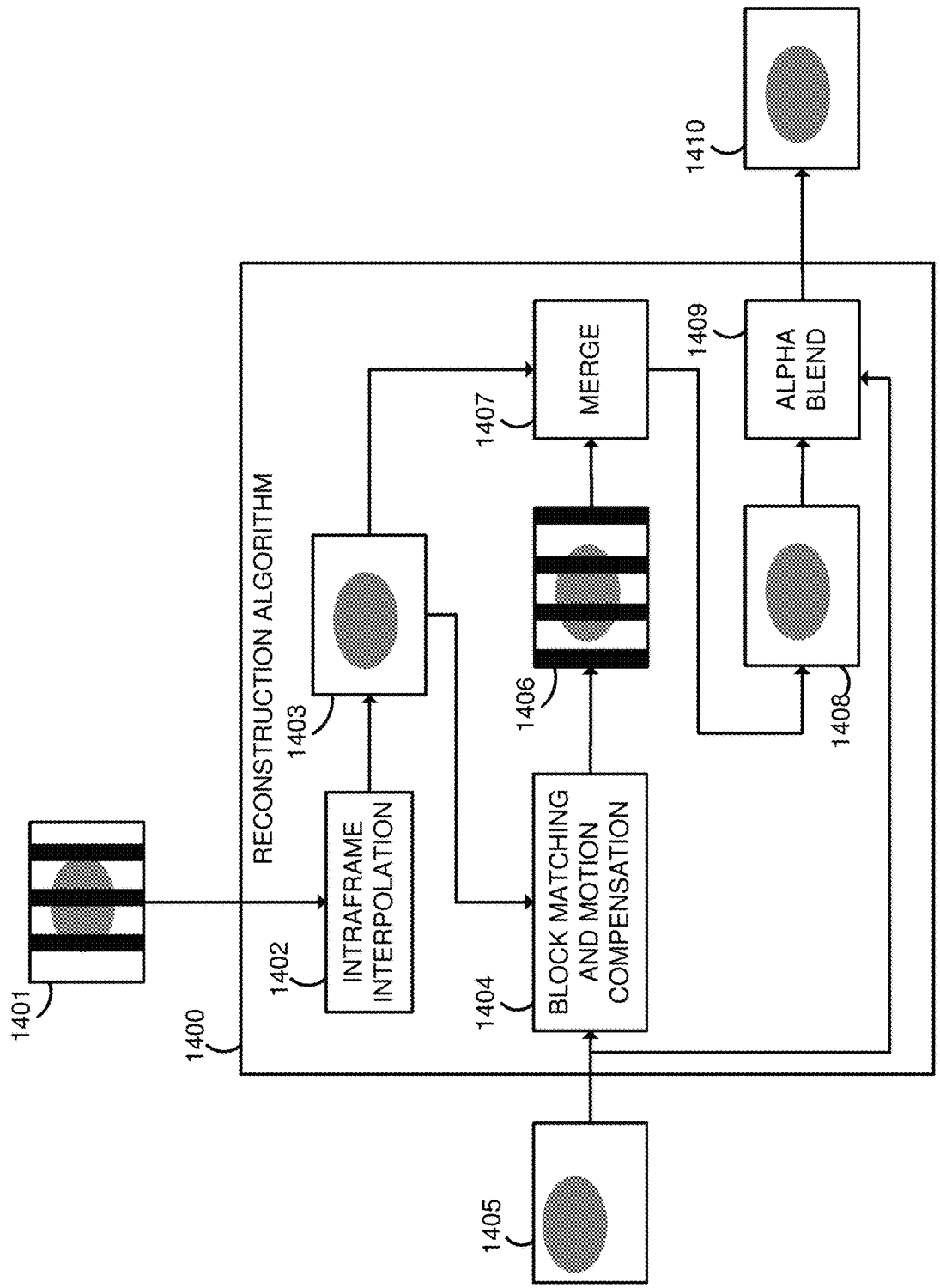
FIG. 14 illustrates a block diagram of the algorithm, showing how a new odd reduced-power frame is used to update the previous reconstructed frame, and in the subsequent iteration, an even reduced-power frame is used to again update the reconstructed frame, in accordance with disclosed embodiments.

FIG. 14 provides additional detail, depicting the reconstruction algorithm's internal architecture. As illustrated in FIG. 14, the reconstruction algorithm 1400 itself is depicted as a block diagram, showing how a new odd reduced-power partial frame 1401 is used to update the previous reconstructed frame. In the subsequent iteration, an even reduced-power frame is used to again update the reconstructed frame in the same manner, and so on.

As further seen in FIG. 14, the reconstruction algorithm 1400 can be understood conceptually as consisting of the following main components:

1. Intraframe interpolation. Intraframe interpolation 1402 (e.g., using cubic splines) is applied to a reduced-power partial frame 1401 (an odd frame n, in this example) to fill in its missing scanlines and produce a complete image frame 1403.

2. Motion compensation. Motion compensation or motion estimation 1404 by locally-adaptive block matching is used to estimate the local motion between the result 1403 of "Intraframe interpolation" and the previous reconstructed frame n−1 1405. The motion vectors thus obtained are used to compute a motion-compensated estimate of the even frame, reconstructed even partial frame 1406, that would have been obtained had the even Tx firings been turned on.

3. Merge. The intraframe interpolated frame 1403 and the reconstructed even partial frame 1406 are merged at operation 1407 as follows. The missing scanlines in the odd frame are filled in using the corresponding scanlines in the reconstructed even frame. For those scanlines that exist in both the odd frame and reconstructed even frame (due to overlap of the Rx scanlines, such as in the (4,2) configuration), the result is obtained by averaging the two values. Following the Merge operation at 1407, the result is a "spatial-only estimate" 1408 of the next reconstructed frame 1408.

4. Blend. Alpha blending (linear combination) 1409 of the previous reconstructed frame n−1 1405 with the spatial-only estimate for the current frame 1408 provides temporal smoothing to obtain reconstructed frame n 1410. This step encourages temporal consistency between successive image frames to reduce the potential for undesirable temporal artifacts such as flickering. Other suitable temporal smoothing methods may be substituted for alpha blending.

Detailed Description of the Algorithm

Notation and Terminology

Let f[n] denote the reconstructed frame n (current frame) of the ultrasound image sequence. This is the image frame that will be displayed or stored. In general, f[n] is an estimate of the full-power frame, as reconstructed by the algorithm; however, the recursion can be initialized using an actual full-power frame.

Let h[n] represent the nth (current) acquired reduced-power image frame (either even or odd).

Let $f_{intra}[n]$ denote a an intraframe interpolated frame obtained from a reduced-power frame.

With reference to FIG. 14, let the set $R=\{r_1, r_2, \ldots, r_S\}$ denote any of the missing groups of S Rx scanlines in a reduced-power frame, with $r_s$ representing one of these scanlines.

In some scan configurations, such as the (4,2) configuration shown in FIGS. 9B and 9C, some of the Rx scanlines are repeated in every frame, while others are not. Let $R_{repeated} \subset R$ denote the subset of scanlines that are repeated, and let $R_{missing} \subset R$ be the set of missing scanlines, which is the complement of $R_{repeated}$.

Figure 15:
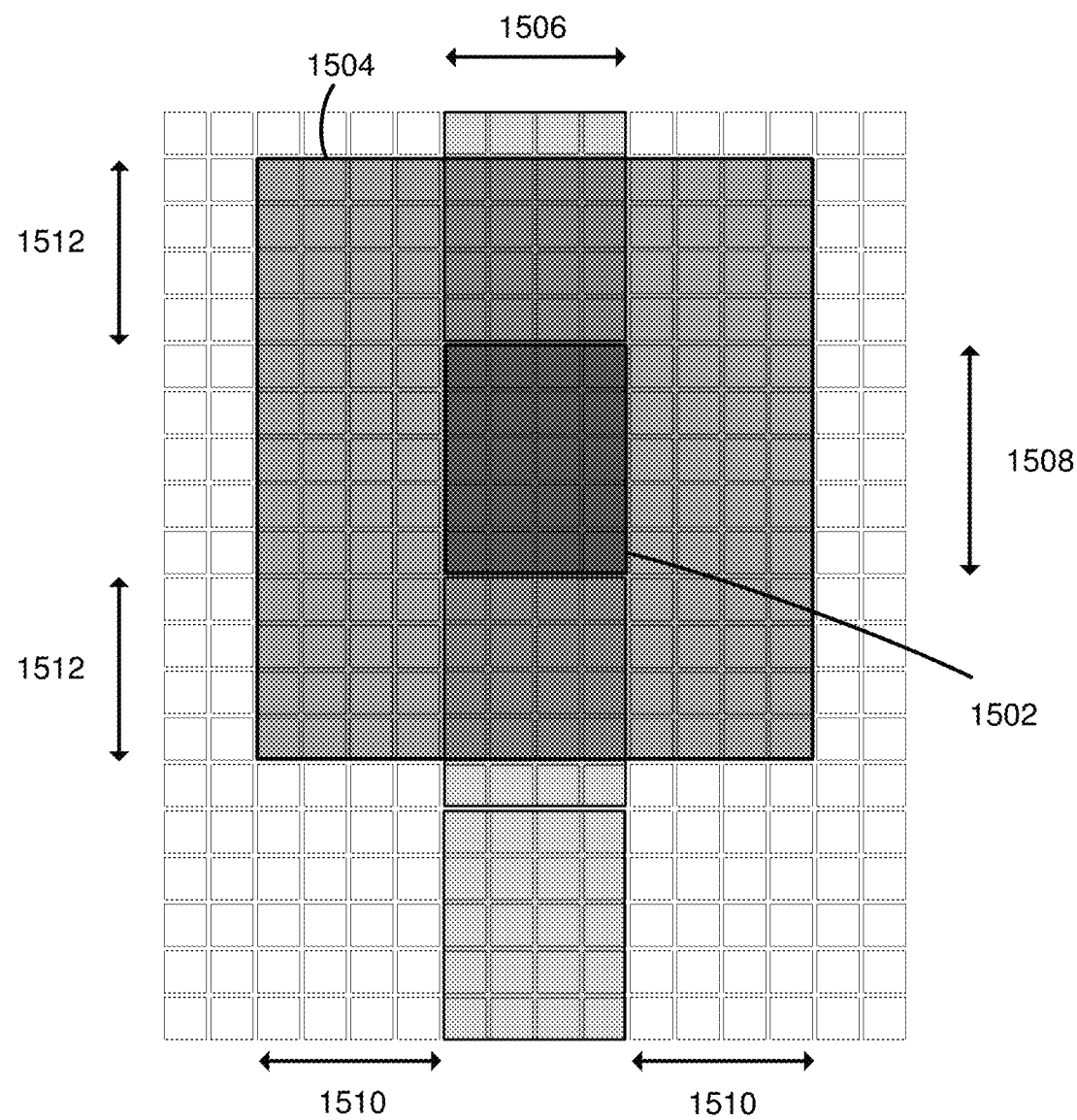
FIG. 15 illustrates an example diagram of a reduced-power frame, including blocks and macroblocks, whereby the macroblocks are used for local block matching to achieve motion-compensated interframe prediction, in accordance with disclosed embodiments.

FIG. 15 illustrates an example diagram defining blocks and macroblocks in the context of a region within a reduced-power frame. The macroblocks are used for local block matching to achieve motion-compensated interframe prediction. The reconstruction algorithm is based on image regions called "blocks" and "macroblocks". A "block" b (1502) is an $S \times H_b$ image array, where S (1506) is the number of Rx scanlines per Tx firing, and $H_b$ (1508) is a variable parameter of the reconstruction algorithm. A macroblock mb (1504) is a $(S+2P_1) \times (H_b+2P_2)$ image array obtained by padding a block on either side by $P_1$ pixels (1510) horizontally and $P_2$ pixels (1512) vertically (or, linearly), as shown in FIG. 15. The dimensions $H_b$ (1508), $P_1$ (1510) and $P_2$ (1512) are variable parameters of the reconstruction algorithm in one embodiment of the present disclosure. For the purpose of this disclosure, the block encompassed by a macroblock will be referred to as the "core" of that macroblock. Note that the macroblocks defined here are not to be confused with the macroblocks used in MPEG video compression.

Review of Generic Block Matching Method

In a preferred embodiment, a customized version of an established method called block matching is the basis for estimation of image motion from frame to frame. The generic concept of block matching is reviewed here to provide background for the discussion of the specific algorithmic component of the present disclosure.

Block matching is typically used to estimate frame-to-frame motion between two image frames of a video. In global block matching, a search strategy is used to determine the offset between the two frames that yields the best match between them, thereby defining a single motion vector that represents the overall motion that has occurred from one frame to the other. In local block matching, subregions of the images are compared to determine local interframe motions at various points within the images. Mathematically, the estimated motion vector v* between any two images or image subregions, $g_1(x)$ and $g_2(x)$, is the solution to the following optimization problem:

$$v^* = \underset{v \in W}{\operatorname{argmax}} \sum_{x \in B} |g_2(x) - g_1(x - v)|^p, \quad (1)$$

in which x denotes the pixel coordinate or the image subregion, W is a spatial window within which the solution for v is searched, B represents the index set of pixels within a block [define: "index set of pixels"] and p is the error norm, which is usually taken to be 1 or 2 (the preferred embodiments for linear mode and sector mode both use p=1). In block matching, the images or image subregions $g_1(x)$ and $g_2(x)$ are customarily referred to as blocks; however, that terminology should not be confused with the definition of "blocks" given previously in the context of FIG. 15.

When performing global block matching, $g_1(x)$ and $g_2(x)$ are entire images, while in the locally-adaptive block matching operation described below, macroblocks take the place of $g_1(x)$ and $g_2(x)$. Operations in the Reconstruction Algorithm (Preferred Embodiment for Linear-Mode Imaging!)

1. Acquire a reduced-power image frame h[n].
2. Use intraframe interpolation via cubic splines to compute a complete image frame $f_{intra}[n]$ from h[n].
3. Perform global block matching of $f_{intra}[n]$ and the previous frame f[n−1], using horizontal search only, i.e., the entire image frame $f_{intra}[n]$ serves as $g_2(x)$ in Equation (1).
4. If the global block-matching error (summation in Equation (1)) exceeds a threshold value $T_f$ then set the estimate $f_s[n]$ of f[n] to be the intraframe interpolation $f_{intra}[n]$ and skip Operations 5-8 below.
5. Otherwise, construct the spatial-only estimate $f_s[n]$ as follows.
   a. In the reduced-power frame h[n], segment every Rx scanline group R vertically into a collection of $S \times H_b$ blocks b (1502). (See FIG. 15).
   b. For each block b and Rx scanline group R in h[n]:
      i. Define a temporary macroblock array mb (1504) containing the pixel values in $f_{intra}[n]$ for the region corresponding to the macroblock region in h[n] for which the current block b is its core.
      ii. Perform locally-adaptive block matching (LABM; see below for details) between mb and f[n−1] to locate the best match and local motion vector between them. Let $mb_{match}$ denote the region of f[n−1] (having the same pixel dimensions as mb) where mb has the best match to f[n−1] (as measured by the summation term in Equation (1)).
      iii. Assign $f_s[n] \leftarrow h[n]$.
      iv. For each block b in $f_s[n]$ assign the pixel values in b as follows:
         1. Assign the pixel values from the core of $mb_{match}$ to b
         2. For the columns in b corresponding to the repeated Rx scanlines in $R_{repeated}$, assign a weighted average of the pixel values in block b of $f_s[n]$ with the corresponding pixels in $f_{intra}[n]$.
6. Construct the reconstructed image via alpha blending, i.e., $f[n] \leftarrow \alpha f_s[n] + (1-\alpha)f[n-1]$, where $\alpha \in [0,1]$.
7. Display or store f[n].
8. Assign $f[n-1] \leftarrow f[n]$.
9. Repeat Operations 1-8

Details of the Locally-Adaptive Block Matching (LABM) Operation (Preferred Embodiment for Linear-Mode Imaging!)

The LABM operation in Step 5.b.ii above is based on matching of the macroblocks (1504) described in FIG. 15 to determine the local motion between successive image frames n and n−1. Beginning from the macroblock nearest the upper left corner of the image, the LABM proceeds sequentially, analyzing the motion of the macroblocks in a raster scan fashion.

Notation

Let $mb_k$ denote the kth macroblock for image frame n, let $v_k^*$ denote the estimated motion vector for macroblock k in frame n, and let $v_k$ represent the true value of that motion vector.

LABM Algorithm for Linear-Mode Imaging!

The LABM algorithm uses a form of Equation (1) in which the macroblocks play the role of the blocks in block matching, as explained earlier. Thus, the governing equation becomes:

$$v_k^* = \underset{v \in W}{\operatorname{argmax}} \sum_{x \in MB_k} |mb_k(x) - mb_{k-1}(x - v)|^p, \quad (2)$$

In the LABM algorithm, the search window W is chosen adaptively. Under the assumption that the local between-frame image motion vectors of adjacent macroblocks are typically similar (i.e., $v_k \approx v_{k-1}$), the window used to find $v_k$ can be defined to be a rectangular region $W_1$ centered at $v_{k-1}^*$. However, if the intensity values in $mb_{k-1}$ are small, the estimated motion vector $v_{k-1}$ may be unreliable, in which case the search for $v_k$ should be conducted over a pre-defined window $W_0$.

The following pseudocode describes the details of the locally-adaptive block matching in Step 5.b.2 above of this disclosure.

```
for each image frame n do
    for each macroblock mb_k in image frame n
    (analyzed in raster scan order) do
        Compute the total intensity I in mb_{k-1}
        if ( I > T_a and mb_k is not the first macroblock
        in a given row)
            Assign W ← W_1
        else
            Assign W ← W_0
        end if
        Determine v*_k by using Equation (2)
        Compare the matching error ε (summation in
        Equation (2)) to a threshold T_b
        if ε > T_b and I > T_a
            Assign the pixel values from f_{intra}[n]
            to the corresponding pixels in
            the core of mb_k
        else
            Assign to the core of mb_k the values in
            the core of mb_{k-1}(x − v_k*)
        end if
    end for
end for
```

Algorithm Parameters for Linear-Mode Imaging

The reconstruction algorithm parameters disclosed in this description should be selected for best image quality in a given application. The values are dependent on the ultrasound probe, the scan configuration, the organ or tissue being imaged, and other details. The following are remarks about the selection of parameters:

1. The values parameter $T_f$, $T_a$ and $T_b$ depend on the noise level in the acquired scanlines. The parameters may be assigned any suitable value, such as any value from 0-50% of the maximum value of the noise that the parameters are compared against. For example, the maximum noise value that $T_f$, $T_a$, and $T_b$ are compared against may be the maximum value for a pixel times the number of pixels in the block. The maximum value for a pixel may depend on the bit depth for a pixel. For example, an 8-bit pixel may have a maximum value of 255. In the illustrative embodiment, $T_f$, $T_a$, and $T_b$ may be, e.g., 5%.
2. The choice of a is based on the spatial resolution and noise level in the acquired image data. The value of a may be any suitable value, such as any value from 0.2-1. In the illustrative embodiment, a may be, e.g., 0.8.
3. Typically, $W_0$ is a bigger window (e.g., 5×5) than $W_1$ (e.g., 3×3). Generally, each of $W_0$ and $W_1$ may be any suitable size, such as 2×2 to 10×10. In some embodiments, $W_0$ and/or $W_1$ may be non-square, such as rectangular, elliptical, or circular.
4. For imaging at 3.5 cm depth, with 450 samples per Rx scanline, the following parameter values for the macroblock have proven useful: $P_1=2$, $P_2=6$, $H_b=6$. In other embodiments: $P_1$, $P_2$, $H_b$ may be any suitable value, such as any value from 1-10.

Sector Mode

The reconstruction algorithm described previously is suitable for linear mode imaging, typically employed when imaging features at a shallower imaging depth, such as veins. Alternatively, sector mode imaging may be employed when imaging either larger anatomical features or features at a deeper imaging depth. In comparison to linear mode imaging, sector mode imaging requires additional power to image the larger or deeper features of interest. According to some embodiments of, the interlaced data acquisition scheme and a computerized image reconstruction algorithm may be modified to be employed in conjunction with sector mode imaging, and be within the scope of the present disclosure.

In sector mode, the input frame 1405, intraframe interpolated frame 1403, spatial-only estimate 1408 and reconstructed frame 1410 consist of scanline data arranged in a rectilinear format, rather than images in a sector-mode format. [Please explain. Should we start off with "in linear mode" rather than "in sector mode" ?] Therefore, conversion must be applied to convert reconstructed frame 1410 to a sector-mode image suitable for display by a process that would be apparent to those skilled in the art.

Operations in the Reconstruction Algorithm (Preferred Embodiment for Sector-Mode Imaging!)

1. Acquire a reduced-power frame h[n].
2. Use intraframe interpolation via cubic splines to compute an intraframe interpolated frame $f_{intra}[n]$ from h[n].
3. Perform global block matching of $f_{intra}[n]$ and the input frame f[n−1], using horizontal search only, i.e., the entire intraframe interpolated frame $f_{intra}[n]$ serves as $g_2(x)$ in Equation (1).
4. If the global block-matching error (summation in Equation (1)) exceeds a threshold value $T_f$ then set the estimate $f_s[n]$ of f[n] to be the intraframe interpolated frame $f_{intra}[n]$ and skip Operations 5-8 below.
5. Otherwise, construct the spatial-only estimate $f_s[n]$ as follows.
   a. In the reduced-power frame h[n], segment every Rx scanline group R vertically (or, linearly) into a collection of $S \times H_b$ blocks b (1502). (See FIG. 15).
   b. For each block b and Rx scanline group R in h[n]:
      i. Define a temporary macroblock array mb (1504) containing the pixel values in $f_{intra}[n]$ for the region corresponding to the macroblock region in h[n] for which the current block b is its core.
      ii. If the average pixel value in mb is greater than some threshold $T_a$ then perform locally-adaptive block matching (LABM; see below for details) between mb and f[n−1] to locate the best match and local motion vector between them. Let $mb_{match}$ denote the region of f[n−1] (having the same pixel dimensions as mb) where mb has the best match to f[n−1] (as measured by the summation term in Equation (1)).
      iii. Assign $f_s[n] \leftarrow h[n]$.
      iv. For each block b in $f_s[n]$ assign the pixel values in b as follows:
         1. Assign the pixel values from the core of $mb_{match}$ to b
         2. For the columns in b corresponding to the repeated Rx scanlines in $R_{repeated}$, assign a weighted average the pixel values in block b of $f_s[n]$ with the corresponding pixels in $f_{intra}[n]$.
6. Construct the reconstructed image via alpha blending, i.e., $f[n] \leftarrow \alpha f_s[n] + (1-\alpha)f[n-1]$, where $\alpha \in [0,1]$.
7. Use scan conversion to transform the rectilinear formatted scanline data in reconstructed frame f[n] to sector-mode format to obtain $f_{sector}[n]$
8. Display or store $f_{sector}[n]$
9. Assign $f[n-1] \leftarrow f[n]$.
10. Repeat Operations 1-8

Details of the Locally-Adaptive Block Matching (LABM) Operation (Preferred Embodiment for Sector-Mode Imaging!)

The LABM operation in Step 5.b.ii of the sector-mode preferred embodiment above is based on matching of the macroblocks mb (1504) described in FIG. 15 to determine the local motion between successive image frames n and n−1. Beginning from the macroblock nearest the upper left corner of the image, the LABM proceeds sequentially, analyzing the motion of the macroblocks in a raster scan fashion.

Notation

Let $mb_k$ denote the kth macroblock for image frame n, let $v_k$ denote the estimated motion vector for macroblock k in frame n, and let $v_k$ represent the true value of that motion vector.

LABM Algorithm for Sector-Mode Imaging!

The LABM algorithm uses a form of Equation (1) in which the macroblocks play the role of the blocks in block matching, as explained earlier. Thus, as in the linear-mode preferred embodiment, the governing equation is Equation (2).

In the LABM algorithm, the search window W is chosen adaptively. Under the assumption that the local between-frame image motion vectors of adjacent macroblocks are typically similar (i.e., $v_k \approx v_{k-1}$), the window used to find $v_k$ can be defined to be a rectangular region $W_1$ centered at $v_{k-1}^*$. However, if the intensity values in $mb_{k-1}$ are small, the estimated motion vector $v_{k-1}$ may be unreliable, in which case the search for $v_k$ should be conducted over a pre-defined window $W_1$.

The following pseudocode describes the details of the locally-adaptive block matching in Step 5.b.2 (of the sector-mode preferred embodiment) above.

```
for each image frame n do
    for each macroblock mb_k in image frame n
    (analyzed in raster scan order) do
        Compute the total intensity I in mb_{k-1}
        if ( I > T_a and mb_k is not the first macroblock
        in a given row)
            Assign W ← W_1
        else
            Assign W ← W_0
        end if
        Determine v*_k by using Equation (2)
        Compare the matching error ε (summation
        in Equation (2)) to a threshold T_b
        if ε > T_b
            Assign the pixel values from f_{intra}[n] to
            the corresponding pixels in
            the core of mb_k
        else
            Measure the matching error ε for the
            four values of v that are offset
            half of a pixel in either the horizontal
            or vertical direction, i.e., v ±
            (0.5,0) and v ± (0,0.5)
            Let v_k** denote the value of v yielding
            the lowest value of ε from
            among these four values
            Assign to the core of mb_k the values in
            the core of mb_{k-1}(x − v_k**)
        end if
    end for
end for
```

Algorithm Parameters for Sector-Mode Imaging!

The reconstruction algorithm parameters disclosed in this description should be selected for best image quality in a given application. The values are dependent on the ultrasound probe, the scan configuration, the organ or tissue being imaged, and other details. The following are remarks about the selection of parameters:

1. The values parameter $T_f$, $T_a$ and $T_b$ depend on the noise level in the acquired scanlines. The parameters may be assigned any suitable value, similar to $T_f$, $T_a$ and $T_b$ discussed above in regard to linear-mode imaging.
2. In the preferred embodiment, $\alpha=1$, which indicates that the blending step is effectively omitted; however, situations may arise where other values of a would be beneficial.
3. Typically, $W_0$ is a bigger window (e.g., 3×3) than $W_1$ (e.g., 3×1). Windows $W_0$ and $W_1$ are typically smaller than in linear-mode imaging. In some embodiments, each of $W_0$ and $W_1$ may be any suitable size, such as 2×1 to 10×10.
4. For imaging at 3.5 cm depth, with 450 samples per Rx scanline, the following parameter values for the macroblock have proven useful: $P_1=2$, $P_2=6$, $H_b=6$.
5. To reduce computational complexity the half-pixel matching step for $v_k**$ described above is omitted when processing cardiac imagery as well as in a prescribed upper (closest to the probe) portion (e.g., 30%) of the scanlines of stationary tissues.

Low Power Mode

In a preferred embodiment, operation of an imaging device can be provided to the user as a user-selectable Low Power Mode, a feature that can be switched on or off by the user as desired, so that the user can be guaranteed optimal image quality when so desired. Low Power Mode can also be automatically shut off briefly when the user requests the capture of a still image or video clip so that any permanently recorded image or video is exactly a full-power frame rather than reconstructed frame (reconstruction of a full-power image from reduced-power data). The degree of power reduction can also be varied during a scan based on probe motion and image content by adjusting the scan configuration in real time.

In alternative embodiments, Low Power Mode employing the interlaced data acquisition scheme and reconstruction algorithm as described herein may automatically activate in response to remaining battery power falling below either a factory preset threshold, or user preset threshold, in order to extend remaining battery life before a recharge is required, while still maintaining high image quality. For example, through a user interface, a user may set activation of the Low Power Mode when the remaining battery power remaining falls below 25% of a full charge. One skilled in the art will recognize that other metrics associated with battery output may be utilized as a basis for setting a circumstance or circumstances when Low Power Mode would be activated.

In alternative embodiments, Low Power Mode employing the interlaced data acquisition scheme and reconstruction algorithm as described herein may automatically activate in response to the imaging device temperature, as measured by one or more device temperature sensors, meeting or exceeding a factory preset temperature, or user preset threshold temperature, in order to mitigate heat buildup and improve safety to both operator and patient, while still maintaining high image quality and prolonging device uptime (or at least reducing device downtime required for device cooldown). For example, through a user interface, a user may set activation of the Low Power Mode when internal imaging device temperature reaches or exceeds a specific temperature.

Figure 16:
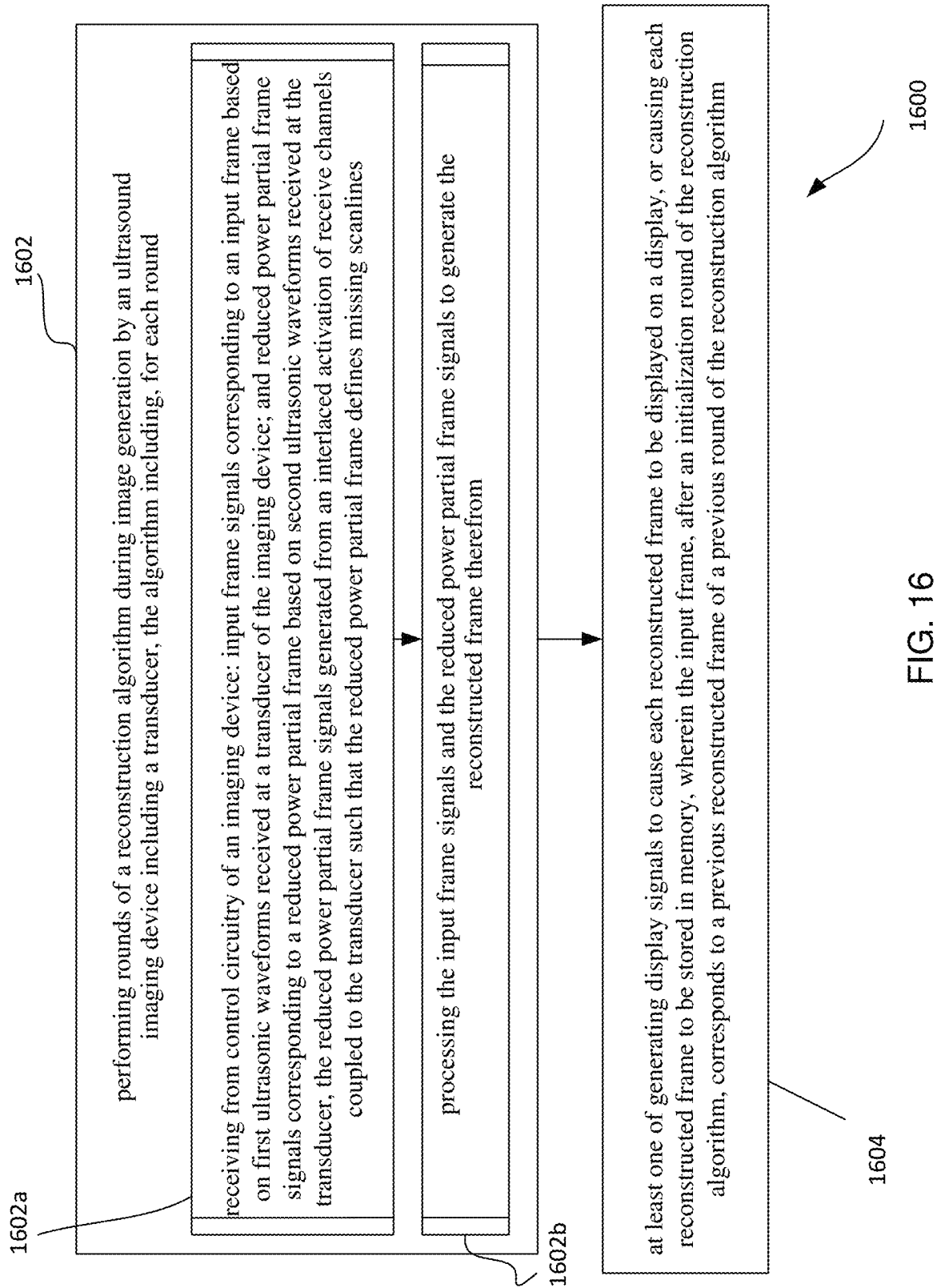
FIG. 16 is a flow diagram of a method according to a first embodiment.

FIG. 16 is a flow chart of a process 1600 to be performed at an apparatus (such as any part of, including one or more processors of) a computing device according to some embodiments. At operation 1602, the process includes performing rounds of a reconstruction algorithm during image generation by an ultrasound imaging device, the algorithm including, for each round: at operation 1602a, receiving from control circuitry of an imaging device: input frame signals corresponding to an input frame based on first ultrasonic waveforms received at a transducer of the imaging device; and reduced power partial frame signals corresponding to a reduced power partial frame based on second ultrasonic waveforms received at the transducer, the reduced power partial frame signals generated from an interlaced activation of receive channels coupled to the transducer such that the reduced power partial frame defines missing scanlines; at operation 1602b, processing the input frame signals and the reduced power partial frame signals to generate the reconstructed frame therefrom. At operation 1604, the process includes at least one of generating display signals to cause each reconstructed frame to be displayed on a display, or causing each reconstructed frame to be stored in memory, wherein the input frame, after an initialization round of the reconstruction algorithm, corresponds to a previous reconstructed frame of a previous round of the reconstruction algorithm.

Figure 17:
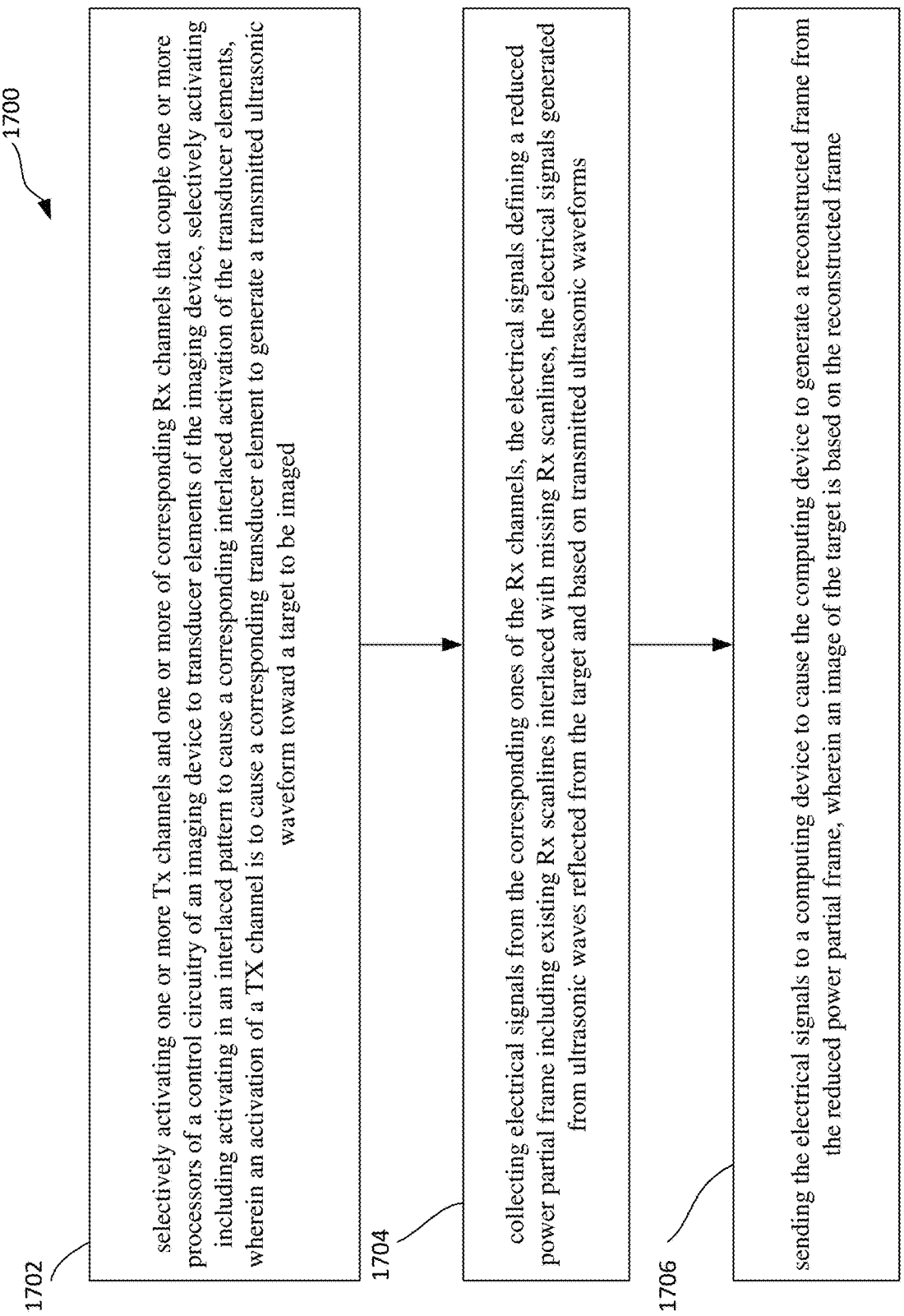
FIG. 17 is a flow diagram of a method according to a second embodiment.

FIG. 17 is a flow chart of a process 1700 to be performed at an apparatus (such as any part of, including one or more processors of) a control circuitry of an imaging device according to some embodiments. At operation 1702, the process includes selectively activating one or more Tx channels and one or more of corresponding Rx channels that couple one or more processors of the control circuitry to transducer elements of the imaging device, selectively activating including activating in an interlaced pattern to cause a corresponding interlaced activation of the transducer elements, wherein an activation of a TX channel is to cause a corresponding transducer element to generate a transmitted ultrasonic waveform toward a target to be imaged. At operation 1704, the process includes collecting electrical signals from the corresponding ones of the Rx channels, the electrical signals defining a reduced power partial frame including existing Rx scanlines interlaced with missing Rx scanlines, the electrical signals generated from ultrasonic waves reflected from the target and based on transmitted ultrasonic waveforms. At operation 1706, the process includes sending the electrical signals to a computing device to cause the computing device to generate a reconstructed frame from the reduced power partial frame, wherein an image of the target is based on the reconstructed frame.

While preferred embodiments of the present disclosure have been shown and described herein, it will be obvious to those skilled in the art that such embodiments are provided by way of example only. It is not intended that embodiments be limited by the specific examples provided within the specification. While embodiments of the disclosure have been described with reference to the aforementioned specification, the descriptions and illustrations of the embodiments herein are not meant to be construed in a limiting sense. Numerous variations, changes, and substitutions will now occur to those skilled in the art without departing from the concepts of the present disclosure. Furthermore, it shall be understood that all aspects of the various embodiments are not limited to the specific depictions, configurations, or relative proportions set forth herein, which depend upon a variety of conditions and variables. It should be understood that various alternatives to the embodiments described herein may be employed. It is therefore contemplated that the disclosure also covers any such alternatives, modifications, variations or equivalents.

Examples

Illustrative examples of the technologies disclosed herein are provided below. An embodiment of the technologies may include any one or more, and any combination of, the examples described below.

Example 1 includes an apparatus of a computing device comprising one or more processors to: perform rounds of a reconstruction algorithm during image generation by an ultrasound imaging device, the algorithm including, for each round, processing an input frame and a reduced power partial frame to generate a reconstructed frame therefrom, wherein the input frame is based on a first ultrasonic waveform received at a transducer of the imaging device, and the reduced power partial frame defines missing scanlines and is based on a second ultrasonic waveform received at the transducer and generated from an interlaced activation of receive channels coupled to the transducer; and at least one of generate display signals to cause each reconstructed frame to be displayed on a display, or cause each reconstructed frame to be stored in memory, wherein the input frame, after an initialization round of the reconstruction algorithm, corresponds to a previous reconstructed frame of a previous round of the reconstruction algorithm.

Example 2 includes the subject matter of Example 1, and optionally, wherein processing the reduced power partial frame includes: performing intraframe interpolation on the reduced power partial frame to fill in the missing scanlines with interpolated scanlines to generate an intraframe interpolated frame; and processing the intraframe interpolated frame to generate the reconstructed frame.

Example 3 includes the subject matter of Example 2, and optionally, wherein the reduced power partial frame includes one of odd scanlines and missing even scanlines, or even scanlines and missing odd scanlines, and wherein processing the reduced power partial frame and the input frame includes: performing motion compensation to estimate a motion vector between the intraframe interpolated frame and the previous reconstructed frame of the previous round to generate a motion compensated frame, the motion compensated frame including even scanlines and missing odd scanlines when the reduced power partial frame includes odd scanlines and missing even scanlines, and including odd scanlines and missing even scanlines when the reduced power partial frame includes even scanlines and missing odd scanlines; and processing the motion compensated frame to generate the reconstructed frame.

Example 4 includes the subject matter of Example 3, and optionally, wherein performing motion compensation includes performing at least one of locally adaptive block matching or globally adaptive block matching.

Example 5 includes the subject matter of Example 4, and optionally, wherein processing the motion compensated frame includes: merging the intraframe interpolated frame with the motion compensated frame to generate a spatial only estimate reconstructed frame, merging including filling missing scanlines of the intraframe interpolated frame with corresponding scanlines of the motion compensated frame; and processing the spatial only estimate reconstructed frame to generate the reconstructed frame.

Example 6 includes the subject matter of Example 5, and optionally, wherein processing the spatial only estimate reconstructed frame includes performing temporal smoothing by blending the spatial only estimate reconstructed frame with the previous reconstructed frame to generate the reconstructed frame.

Example 7 includes the subject matter of Example 3, and optionally, wherein: the motion vector corresponds to an estimated motion vector v* between subregions $g_1(x)$ of the previous reconstructed frame and subregions $g_2(x)$ of the intraframe interpolated frame, v* given by:

$$v^* = \underset{v \in W}{\operatorname{argmax}} \sum\nolimits_{x \in B} |g_2(x) - g_1(x-v)|^p$$

wherein x denotes a pixel coordinate of an image subregion, W denotes a spatial window within which a solution for v is searched, B denotes an index set of pixels within a block, and p denotes an error norm equal to 1 or 2; and block matching further includes performing global block matching using a horizontal search only where an entirety of the intraframe interpolated frame corresponds to $g_2(x)$.

Example 8 includes the subject matter of Example 7, the one or more processors to, in response to a determination that v* exceeds a threshold value, set the reconstructed frame to correspond to the spatial only estimate reconstructed frame.

Example 9 includes the subject matter of Example 7, the one or more processors to merge the intraframe interpolated frame with the motion compensated frame to generate a spatial only estimate reconstructed frame, merging including filling missing scanlines of the intraframe interpolated frame with corresponding scanlines of the motion compensated frame by: segmenting a group R of scanlines of the reduced power partial frame linearly into a collection of S×Hb blocks b; and for each block B and group R: defining a temporary macroblock array mb of pixel values in the intraframe interpolated frame that correspond to a region of the reduced power partial frame of which block B is a core; and performing locally adaptive block matching between mb and the previous reconstructed frame to locate a best match, the best match corresponding to a macroblock region $mb_{match}$ of the previous reconstructed frame having a same pixel dimension as mb; setting the spatial only estimate reconstructed frame to correspond to the reduced power partial frame; and for each block B in the spatial only estimate reconstructed frame: assigning to block B pixel values from a core of $mb_{match}$; and for columns in B corresponding to repeated receive scanlines, assigning a weighted average of pixel values of block B of the spatial only estimate reconstructed frame with corresponding pixel values in the intraframe interpolated frame.

Example 10 includes the subject matter of Example 6, and optionally, wherein performing temporal smoothing includes using alpha blending.

Example 11 includes the subject matter of Example 9, and optionally, wherein, in a sector mode of operation of the imaging device, the one or more processors are to: perform the locally adaptive block matching in response to a determination that an average pixel value in mb is greater than a threshold; and use scan conversion to transform rectilinear formatted scanline data in the reconstructed frame to sector-mode formatted scanline data to generate the reconstructed frame.

Example 12 includes the subject matter of Example 9, and optionally, wherein performing locally adaptive block matching includes, for each macroblock $mb_k$ in an image frame, where k is a number designating each macroblock: computing a total intensity in a prior macroblock $mb_{k-1}$ of the image frame; in response to a determination that the intensity is above a first threshold and that $mb_k$ is not a first macroblock in a given row of the image, assigning a first spatial window W1 to correspond to a value of a spatial window W within which a solution for a motion vector v is to be searched; in response to a determination that the intensity is not above a first threshold or that $mb_k$ is not a first macroblock in a given row of the image, assigning a second spatial window W2 to correspond to a value of a spatial window W within which a solution for a motion vector v is to be searched; determining an estimated motion vector $v_k^*$ using:

$$v_k^* = \underset{v \in W}{\operatorname{argmax}} \sum\nolimits_{x \in MB_k} |mb_k(x) - mb_{k-1}(x-v)|^p$$

wherein x denotes a pixel coordinate of an image subregion, W denotes the spatial window within which a solution for v is searched, Bk denotes an index set of pixels within a macroblock k, and p denotes an error norm equal to 1 or 2, and wherein matching error $\varepsilon = \sum_{x \in MB_k} |mb_k(x) - mb_{k-1}(x-v)|^p$; in response to a determination that E is larger than a second threshold, assigning pixel values from the intraframe interpolated frame to corresponding pixels in a core of $mb_k$; and in response to a determination that E is not larger than a second threshold, assigning to a core of $mb_k$ values in a core of $mb_{k-1}(x-v_k^*)$.

Example 13 includes the subject matter of Example 1, and optionally, wherein, in a sector mode of the imaging device, the one or more processors are to, in response to a determination that E is not larger than a second threshold: measure ε for four values of v that are offset half of a pixel in either a horizontal direction or a vertical direction; and assign to the core of $mb_k$ values in the core of $mb_{k-1}(x-v_k^{**})$.

Example 14 includes the subject matter of Example 1, further including the memory, the memory coupled to the one or more processors.

Example 15 includes the subject matter of any one of Examples 1 and 14, further including a wireless transceiver coupled to the one or more processors, the wireless transceiver to receive the input frame and the reduced power partial frame from a control circuitry of the imaging device.

Example 16 includes a method to be performed at an apparatus of a computing device comprising: performing rounds of a reconstruction algorithm during image generation by an ultrasound imaging device, the algorithm including, for each round, processing an input frame and a reduced power partial frame to generate a reconstructed frame therefrom, wherein the input frame is based on a first ultrasonic waveform received at a transducer of the imaging device, and the reduced power partial frame defines missing scanlines and is based on a second ultrasonic waveform received at the transducer and generated from an interlaced activation of receive channels coupled to the transducer; and at least one of generating display signals to cause each reconstructed frame to be displayed on a display, or causing each reconstructed frame to be stored in memory, wherein the input frame, after an initialization round of the reconstruction algorithm, corresponds to a previous reconstructed frame of a previous round of the reconstruction algorithm.

Example 17 includes the subject matter of Example 16, and optionally, wherein processing the reduced power partial frame includes: performing intraframe interpolation on the reduced power partial frame to fill in the missing scanlines with interpolated scanlines to generate an intraframe interpolated frame; and processing the intraframe interpolated frame to generate the reconstructed frame.

Example 18 includes the subject matter of Example 17, and optionally, wherein the reduced power partial frame includes one of odd scanlines and missing even scanlines, or even scanlines and missing odd scanlines, and wherein processing the reduced power partial frame and the input frame includes: performing motion compensation to estimate a motion vector between the intraframe interpolated frame and the previous reconstructed frame of the previous round to generate a motion compensated frame, the motion compensated frame including even scanlines and missing odd scanlines when the reduced power partial frame includes odd scanlines and missing even scanlines, and including odd scanlines and missing even scanlines when the reduced power partial frame includes even scanlines and missing odd scanlines; and processing the motion compensated frame to generate the reconstructed frame.

Example 19 includes the subject matter of Example 18, and optionally, wherein performing motion compensation includes performing at least one of locally adaptive block matching or globally adaptive block matching.

Example 20 includes the subject matter of Example 19, and optionally, wherein processing the motion compensated frame includes: merging the intraframe interpolated frame with the motion compensated frame to generate a spatial only estimate reconstructed frame, merging including filling missing scanlines of the intraframe interpolated frame with corresponding scanlines of the motion compensated frame; and processing the spatial only estimate reconstructed frame to generate the reconstructed frame.

Example 21 includes the subject matter of Example 20, and optionally, wherein processing the spatial only estimate reconstructed frame includes performing temporal smoothing by blending the spatial only estimate reconstructed frame with the previous reconstructed frame to generate the reconstructed frame.

Example 22 includes the subject matter of Example 18, and optionally, wherein: the motion vector corresponds to an estimated motion vector v* between subregions $g_1(x)$ of the previous reconstructed frame and subregions $g_2(x)$ of the intraframe interpolated frame, v* given by:

$$v^* = \underset{v \in W}{\mathrm{argmax}} \sum_{x \in B} |g_2(x) - g_1(x-v)|^p$$

wherein x denotes a pixel coordinate of an image subregion, W denotes a spatial window within which a solution for v is searched, B denotes an index set of pixels within a block, and p denotes an error norm equal to 1 or 2; and block matching further includes performing global block matching using a horizontal search only where an entirety of the intraframe interpolated frame corresponds to $g_2(x)$.

Example 23 includes the subject matter of Example 22, and optionally, further including, in response to a determination that v* exceeds a threshold value, setting the reconstructed frame to correspond to the spatial only estimate reconstructed frame.

Example 24 includes the subject matter of Example 22, further including merging the intraframe interpolated frame with the motion compensated frame to generate a spatial only estimate reconstructed frame, merging including filling missing scanlines of the intraframe interpolated frame with corresponding scanlines of the motion compensated frame by: segmenting a group R of scanlines of the reduced power partial frame linearly into a collection of S×Hb blocks b; and for each block B and group R: defining a temporary macroblock array mb of pixel values in the intraframe interpolated frame that correspond to a region of the reduced power partial frame of which block B is a core; and performing locally adaptive block matching between mb and the previous reconstructed frame to locate a best match, the best match corresponding to a macroblock region $mb_{match}$ of the previous reconstructed frame having a same pixel dimension as mb; setting the spatial only estimate reconstructed frame to correspond to the reduced power partial frame; and for each block B in the spatial only estimate reconstructed frame: assigning to block B pixel values from a core of $mb_{match}$; and for columns in B corresponding to repeated receive scanlines, assigning a weighted average of pixel values of block B of the spatial only estimate reconstructed frame with corresponding pixel values in the intraframe interpolated frame.

Example 25 includes the subject matter of Example 21, and optionally, wherein performing temporal smoothing includes using alpha blending.

Example 26 includes the subject matter of Example 24, and optionally, including, in a sector mode of operation of the imaging device: performing the locally adaptive block matching in response to a determination that an average pixel value in mb is greater than a threshold; and using scan conversion to transform rectilinear formatted scanline data in the reconstructed frame to sector-mode formatted scanline data to generate the reconstructed frame.

Example 27 includes the subject matter of Example 24, and optionally, wherein performing locally adaptive block matching includes, for each macroblock $mb_k$ in an image frame, where k is a number designating each macroblock: computing a total intensity in a prior macroblock $mb_{k-1}$ of the image frame; in response to a determination that the intensity is above a first threshold and that $mb_k$ is not a first macroblock in a given row of the image, assigning a first spatial window W1 to correspond to a value of a spatial window W within which a solution for a motion vector v is to be searched; in response to a determination that the intensity is not above a first threshold or that $mb_k$ is not a first macroblock in a given row of the image, assigning a second spatial window W2 to correspond to a value of a spatial window W within which a solution for a motion vector v is to be searched; determining an estimated motion vector vk* using:

$$v_k^* = \underset{v \in W}{\mathrm{argmax}} \sum_{x \in MB_k} |mb_k(x) - mb_{k-1}(x-v)|^p$$

wherein x denotes a pixel coordinate of an image subregion, W denotes the spatial window within which a solution for v is searched, Bk denotes an index set of pixels within a macroblock k, and p denotes an error norm equal to 1 or 2, and wherein matching error $\varepsilon = \sum_{x \in MB_k} |mb_k(x) - mb_{k-1}(x-v)|^p$; in response to a determination that $\varepsilon$ is larger than a second threshold, assigning pixel values from the intraframe interpolated frame to corresponding pixels in a core of $mb_k$; and in response to a determination that $\varepsilon$ is not larger than a second threshold, assigning to a core of $mb_k$ values in a core of $mb_{k-1}(x-v_k^*)$.

Example 28 includes the subject matter of Example 27, and optionally, further including, in a sector mode of the imaging device, in response to a determination that ε is not larger than a second threshold: measuring F for four values of v that are offset half of a pixel in either a horizontal direction or a vertical direction; and assigning to the core of $mb_k$ values in the core of $mb_{k-1}(x-v_k^{**})$.

Example 29 includes the subject matter of Example 16, and optionally, further including receiving, via a wireless transceiver, the input frame and the reduced power partial frame from a control circuitry of the imaging device.

Example 30 includes an apparatus of a control circuitry of an ultrasound imaging device, the apparatus including one or more processors to be coupled to transducer elements of an ultrasonic transducer of the imaging device to: cause an interlaced activation of the transducer elements to generate a transmitted ultrasonic waveform toward a target to be imaged and to collect electrical signals defining a reduced power partial frame including existing receive (Rx) scanlines interlaced with missing Rx scanlines, the electrical signals generated from ultrasonic waves reflected from the target and based on transmitted ultrasonic waveforms; and send the electrical signals to a computing device to cause the computing device to generate a reconstructed frame from the reduced power partial frame, wherein an image of the target is based on the reconstructed frame.

Example 31 includes the subject matter of Example 30, and optionally, wherein: the one or more processors are to be coupled to the transducer elements by way of transmit (Tx) channels and receive (Rx) channels of the imaging device; the one or more processors are to cause the interlaced activation by selectively activating one or more of the Tx channels and one or more of corresponding ones of the Rx channels in an interlaced pattern; and at least a number of the Tx channels or a number of the Rx channels is less than a number of the transducer elements, the one or more processors to control a functional coupling of said at least the number of the Tx channels or the number of the Rx channels to the transducer elements prior to selectively activating.

Example 32 includes the subject matter of Example 31, and optionally, wherein the one or more processors are to control the functional coupling by controlling said at least the number of the Tx channels or one or more of the number of the Rx channels to address respective ones of the transducer elements based on the interlaced pattern.

Example 33 includes the subject matter of Example 31, and optionally, wherein selectively activating in an interlaced pattern includes performing an alternating activation of odd and even ones of the one or more of transmit (Tx) channels of the imaging device and a corresponding alternating activation of the one or more of corresponding ones of receive (Rx) channels of the imaging device.

Example 34 includes the subject matter of Example 31, and optionally, wherein the one or more of corresponding ones of the Rx channels include a plurality of Rx channels for at least some of the one or more of the Tx channels.

Example 35 includes the subject matter of Example 31, and optionally, wherein the one or more processors are to: in a linear mode, selectively activate one or more of the Tx channels in the interlaced pattern such an activated one of the one or more of the Tx channels generated ultrasonic waves in a same direction as a direction of ultrasonic waves generated by a previous activated one of the one or more of the Tx channels; and in a sector mode, selectively activate one or more of the Tx channels in the interlaced pattern such an activated one of the one or more of the Tx channels generated ultrasonic waves in a different direction as a direction of ultrasonic waves generated by a previous activated one of the one or more of the Tx channels.

Example 36 includes the subject matter of Example 30, and optionally, wherein the transducer elements include micromachined ultrasonic transducer elements.

Example 37 includes the subject matter of Example 36, and optionally, wherein the micromachined ultrasonic transducer elements include one of capacitive micromachined ultrasonic transducer (cMUT) elements or piezoelectric micromachined ultrasonic transducer (pMUT) elements.

Example 38 includes the subject matter of Example 30, and optionally, further including the computing device, the computing device to: perform rounds of a reconstruction algorithm during image generation by the ultrasound imaging device, the algorithm including, for each round: receiving, from the control circuitry: input frame corresponding to an input frame based on first ultrasonic waveforms received at a transducer of the imaging device; and reduced power partial frame corresponding to the reduced power partial frame based on second ultrasonic waveforms received at the transducer; and processing the input frame and the reduced power partial frame to generate the reconstructed frame therefrom; and at least one of generate display signals to cause each reconstructed frame to be displayed on a display, or causing each reconstructed frame to be stored in memory, wherein the input frame, after an initialization round of the reconstruction algorithm, corresponds to a previous reconstructed frame of a previous round of the reconstruction algorithm.

Example 39 includes a method to be performed at an apparatus of a control circuitry of an ultrasound imaging device, the apparatus including one or more processors to be coupled to transducer elements of an ultrasonic transducer of the imaging device, the method including: causing an interlaced activation of the transducer elements to generate a transmitted ultrasonic waveform toward a target to be imaged and to collect electrical signals defining a reduced power partial frame including existing receive (Rx) scanlines interlaced with missing Rx scanlines, the electrical signals generated from ultrasonic waves reflected from the target and based on transmitted ultrasonic waveforms; and sending the electrical signals to a computing device to cause the computing device to generate a reconstructed frame from the reduced power partial frame, wherein an image of the target is based on the reconstructed frame.

Example 40 includes the subject matter of Example 39, and optionally, wherein: the one or more processors are to be coupled to the transducer elements by way of transmit (Tx) channels and receive (Rx) channels of the imaging device; causing the interlaced activation includes selectively activating one or more of the Tx channels and one or more of corresponding ones of the Rx channels in an interlaced pattern; and at least a number of the Tx channels or a number of the Rx channels is less than a number of the transducer elements, the method further including controlling a functional coupling of said at least the number of the Tx channels or the number of the Rx channels to the transducer elements prior to selectively activating.

Example 41 includes the subject matter of Example 40, and optionally, wherein controlling the functional coupling includes controlling said at least the number of the Tx channels or one or more of the number of the Rx channels to address respective ones of the transducer elements based on the interlaced pattern.

Example 42 includes the subject matter of Example 40, and optionally, wherein selectively activating in an interlaced pattern includes performing an alternating activation of odd and even ones of the one or more of the Tx channels and a corresponding alternating activation of the one or more of corresponding ones of the Rx channels.

Example 43 includes the subject matter of Example 40, and optionally, wherein the one or more of corresponding ones of the Rx channels include a plurality of Rx channels for at least some of the one or more of the Tx channels.

Example 44 includes the subject matter of Example 40, further including: in a linear mode, selectively activating one or more of the Tx channels in the interlaced pattern such an activated one of the one or more of the Tx channels generated ultrasonic waves in a same direction as a direction of ultrasonic waves generated by a previous activated one of the one or more of the Tx channels; and in a sector mode, selectively activating one or more of the Tx channels in the interlaced pattern such an activated one of the one or more of the Tx channels generated ultrasonic waves in a different direction as a direction of ultrasonic waves generated by a previous activated one of the one or more of the Tx channels.

Example 45 includes the subject matter of Example 40, and optionally, wherein the transducer elements include micromachined ultrasonic transducer elements.

Example 46 includes the subject matter of Example 45, and optionally, wherein the micromachined ultrasonic transducer elements include one of capacitive micromachined ultrasonic transducer (cMUT) elements or piezoelectric micromachined ultrasonic transducer (pMUT) elements.

Example 47 includes the subject matter of Example 40, further including: performing rounds of a reconstruction algorithm during image generation by the ultrasound imaging device, the algorithm including, for each round: receiving, from the control circuitry: input frame corresponding to an input frame based on first ultrasonic waveforms received at a transducer of the imaging device; and reduced power partial frame corresponding to the reduced power partial frame based on second ultrasonic waveforms received at the transducer; and processing the input frame and the reduced power partial frame to generate the reconstructed frame therefrom; and at least one of generating display signals to cause each reconstructed frame to be displayed on a display, or causing each reconstructed frame to be stored in memory, wherein the input frame, after an initialization round of the reconstruction algorithm, corresponds to a previous reconstructed frame of a previous round of the reconstruction algorithm.

Example 48 includes an apparatus of an ultrasound imaging device, the apparatus including one or more processors to be coupled to transducer elements of an ultrasonic transducer of the imaging device, the one or more processors to: perform rounds of image generation for the ultrasound imaging device, each round including: causing an interlaced activation of the transducer elements to generate a transmitted ultrasonic waveform toward a target to be imaged and to collect electrical signals defining a reduced power partial frame including existing receive (Rx) scanlines interlaced with missing Rx scanlines, the electrical signals generated from ultrasonic waves reflected from the target and based on the transmitted ultrasonic waveform; and processing the reduced power partial frame along with an input frame to generate a reconstructed frame therefrom; and at least one of generate display signals to cause each reconstructed frame to be displayed on a display, or cause each reconstructed frame to be stored in memory, wherein the input frame, after an initialization round of the rounds of image generation, corresponds to a previous reconstructed frame of a previous round of image generation.

Example 49 includes the subject matter of Example 48, and optionally, wherein: the one or more processors are to be coupled to the transducer elements by way of transmit (Tx) channels and receive (Rx) channels of the imaging device; the one or more processors are to cause the interlaced activation by selectively activating one or more of the Tx channels and one or more of corresponding ones of the Rx channels in an interlaced pattern; and selectively activating includes performing an alternating activation of odd and even ones of the one or more of the Tx channels and a corresponding alternating activation of the one or more of corresponding ones of the Rx channels.

Example 50 includes the subject matter of Example 49, and optionally, wherein the one or more of corresponding ones of the Rx channels include a plurality of Rx channels for at least some of the one or more of the Tx channels.

Example 51 includes the subject matter of Example 49, and optionally, wherein the one or more processors are to: in a linear mode, selectively activate one or more of the Tx channels in the interlaced pattern such an activated one of the one or more of the Tx channels generated ultrasonic waves in a same direction as a direction of ultrasonic waves generated by a previous activated one of the one or more of the Tx channels; and in a sector mode, selectively activate one or more of the Tx channels in the interlaced pattern such an activated one of the one or more of the Tx channels generated ultrasonic waves in a different direction as a direction of ultrasonic waves generated by a previous activated one of the one or more of the Tx channels.

Example 52 includes the subject matter of Example 48, and optionally, wherein processing the reduced power partial frame includes: performing intraframe interpolation on the reduced power partial frame to fill in the missing Rx scanlines with interpolated scanlines to generate an intraframe interpolated frame; and processing the intraframe interpolated frame to generate the reconstructed frame.

Example 53 includes the subject matter of Example 52, and optionally, wherein the reduced power partial frame includes one of odd scanlines and missing even Rx scanlines, or even scanlines and missing odd Rx scanlines, and wherein processing the reduced power partial frame and the input frame includes: performing motion compensation to estimate a motion vector between the intraframe interpolated frame and the previous reconstructed frame of the previous round to generate a motion compensated frame, the motion compensated frame including even scanlines and missing odd Rx scanlines when the reduced power partial frame includes odd scanlines and missing even Rx scanlines, and includes even scanlines and missing odd Rx scanlines; and processing the motion compensated frame to generate the reconstructed frame.

Example 54 includes the subject matter of Example 53, and optionally, wherein performing motion compensation includes performing at least one of locally adaptive block matching or globally adaptive block matching.

Example 55 includes the subject matter of Example 53, and optionally, wherein processing the motion compensated frame includes: merging the intraframe interpolated frame with the motion compensated frame to generate a spatial only estimate reconstructed frame, merging including filling missing Rx scanlines of the intraframe interpolated frame with corresponding scanlines of the motion compensated frame; and processing the spatial only estimate reconstructed frame to generate the reconstructed frame.

Example 56 includes the subject matter of Example 55, and optionally, wherein processing the spatial only estimate reconstructed frame includes performing temporal smoothing by blending the spatial only estimate reconstructed frame with the previous reconstructed frame to generate the reconstructed frame.

Example 57 includes the subject matter of Example 54, and optionally, wherein: the motion vector corresponds to an estimated motion vector v* between subregions $g_1(x)$ of the previous reconstructed frame and subregions $g_2(x)$ of the intraframe interpolated frame, v* being given by:

$$v^* = \underset{v \in W}{\operatorname{argmax}} \sum\nolimits_{x \in B} |g_2(x) - g_1(x-v)|^p$$

wherein x denotes a pixel coordinate of an image subregion, W denotes a spatial window within which a solution for v is searched, B denotes an index set of pixels within a block, and p denotes an error norm equal to 1 or 2; and block matching further includes performing global block matching using a horizontal search only where an entirety of the intraframe interpolated frame corresponds to $g_2(x)$.

Example 58 includes the subject matter of Example 57, the one or more processors to, in response to a determination that v* exceeds a threshold value, set the reconstructed frame to correspond to the spatial only estimate reconstructed frame.

Example 59 includes the subject matter of Example 57, the one or more processors to merge the intraframe interpolated frame with the motion compensated frame to generate a spatial only estimate reconstructed frame, merging including filling missing Rx scanlines of the intraframe interpolated frame with corresponding scanlines of the motion compensated frame by: segmenting a group R of scanlines of the reduced power partial frame linearly into a collection of S×Hb blocks b; and for each block B and group R: defining a temporary macroblock array mb of pixel values in the intraframe interpolated frame that correspond to a region of the reduced power partial frame of which block B is a core; and performing locally adaptive block matching between mb and the previous reconstructed frame to locate a best match, the best match corresponding to a macroblock region $mb_{match}$ of the previous reconstructed frame having a same pixel dimension as mb; setting the spatial only estimate reconstructed frame to correspond to the reduced power partial frame; and for each block B in the spatial only estimate reconstructed frame: assigning to block B pixel values from a core of $mb_{match}$; and for columns in B corresponding to repeated receive scanlines, assigning a weighted average of pixel values of block B of the spatial only estimate reconstructed frame with corresponding pixel values in the intraframe interpolated frame.

Example 60 includes the subject matter of Example 56, and optionally, wherein performing temporal smoothing includes using alpha blending.

Example 61 includes the subject matter of Example 59, and optionally, wherein, in a sector mode of operation of the imaging device, the one or more processors are to: perform the locally adaptive block matching in response to a determination that an average pixel value in mb is greater than a threshold; and use scan conversion to transform rectilinear formatted scanline data in the reconstructed frame to sector-mode formatted scanline data to generate the reconstructed frame.

Example 62 includes the subject matter of Example 59, and optionally, wherein performing locally adaptive block matching includes, for each macroblock $mb_k$ in an image frame, where k is a number designating each macroblock: computing a total intensity in a prior macroblock $mb_{k-1}$ of the image frame; in response to a determination that the intensity is above a first threshold and that $mb_k$ is not a first macroblock in a given row of the image, assigning a first spatial window W1 to correspond to a value of a spatial window W within which a solution for a motion vector v is to be searched; in response to a determination that the intensity is not above a first threshold or that $mb_k$ is not a first macroblock in a given row of the image, assigning a second spatial window W2 to correspond to a value of a spatial window W within which a solution for a motion vector v is to be searched; determining an estimated motion vector vk* using:

$$v_k^* = \underset{v \in W}{\operatorname{argmax}} \sum\nolimits_{x \in MB_k} |mb_k(x) - mb_{k-1}(x-v)|^p$$

wherein x denotes a pixel coordinate of an image subregion, W denotes the spatial window within which a solution for v is searched, Bk denotes an index set of pixels within a macroblock k, and p denotes an error norm equal to 1 or 2, and wherein matching error $\varepsilon = \sum_{x \in MB_k} |mb_k(x) - mb_{k-1}(x-v)|^p$; in response to a determination that $\varepsilon$ is larger than a second threshold, assigning pixel values from the intraframe interpolated frame to corresponding pixels in a core of $mb_k$; and in response to a determination that $\varepsilon$ is not larger than a second threshold, assigning to a core of $mb_k$ values in a core of $mb_{k-1}(x-v_k^*)$.

Example 63 includes the subject matter of Example 62, and optionally, wherein, in a sector mode of the imaging device, the one or more processors are to, in response to a determination that $\varepsilon$ is not larger than a second threshold: measure $\varepsilon$ for four values of v that are offset half of a pixel in either a horizontal direction or a vertical direction; and assign to the core of $mb_k$ values in the core of $mb_{k-1}(x-v_k^{**})$.

Examples 64 includes the apparatus of Example 48, further including the memory, the memory coupled to the one or more processors.

Example 65 includes the apparatus of any one of Examples 48 and 64, further including a wireless transceiver coupled to the one or more processors, the wireless transceiver to cause transmission of the reconstructed frame to the display.

Example 66 includes a method to be performed at an apparatus of an ultrasound imaging device, the apparatus including one or more processors to be coupled to transducer elements of an ultrasonic transducer of the imaging device, the method including: performing rounds of image generation for the ultrasound imaging device, each round including: causing an interlaced activation of the transducer elements to generate a transmitted ultrasonic waveform toward a target to be imaged and to collect electrical signals defining a reduced power partial frame including existing receive (Rx) scanlines interlaced with missing Rx scanlines, the electrical signals generated from ultrasonic waves reflected from the target and based on the transmitted ultrasonic waveform; and processing the reduced power partial frame along with an input frame to generate a reconstructed frame therefrom; and at least one of generating display signals to cause each reconstructed frame to be displayed on a display, or causing each reconstructed frame to be stored in memory, wherein the input frame, after an initialization round of the rounds of image generation, corresponds to a previous reconstructed frame of a previous round of image generation.

Example 67 includes the subject matter of Example 66, and optionally, wherein: the one or more processors are to be coupled to the transducer elements by way of transmit (Tx) channels and receive (Rx) channels of the imaging device; causing the interlaced activation includes selectively activating one or more of the Tx channels and one or more of corresponding ones of the Rx channels in an interlaced pattern; and selectively activating includes performing an alternating activation of odd and even ones of the one or more of the Tx channels and a corresponding alternating activation of the one or more of corresponding ones of the Rx channels.

Example 68 includes the subject matter of Example 67, and optionally, wherein the one or more of corresponding ones of the Rx channels include a plurality of Rx channels for at least some of the one or more of the Tx channels.

Example 69 includes the subject matter of Example 67, and optionally, further including: in a linear mode, selectively activating one or more of the Tx channels in the interlaced pattern such an activated one of the one or more of the Tx channels generated ultrasonic waves in a same direction as a direction of ultrasonic waves generated by a previous activated one of the one or more of the Tx channels; and in a sector mode, selectively activating one or more of the Tx channels in the interlaced pattern such an activated one of the one or more of the Tx channels generated ultrasonic waves in a different direction as a direction of ultrasonic waves generated by a previous activated one of the one or more of the Tx channels.

Example 70 includes the subject matter of Example 67, wherein processing the reduced power partial frame includes: performing intraframe interpolation on the reduced power partial frame to fill in the missing Rx scanlines with interpolated scanlines to generate an intraframe interpolated frame; and processing the intraframe interpolated frame to generate the reconstructed frame.

Example 71 includes the subject matter of Example 70, and optionally, wherein the reduced power partial frame includes one of odd scanlines and missing even Rx scanlines, or even scanlines and missing odd Rx scanlines, and wherein processing the reduced power partial frame and the input frame includes: performing motion compensation to estimate a motion vector between the intraframe interpolated frame and the previous reconstructed frame of the previous round to generate a motion compensated frame, the motion compensated frame including even scanlines and missing odd Rx scanlines when the reduced power partial frame includes odd scanlines and missing even Rx scanlines, and including odd scanlines and missing even Rx scanlines when the reduced power partial frame includes even scanlines and missing odd Rx scanlines; and processing the motion compensated frame to generate the reconstructed frame.

Example 72 includes the subject matter of Example 71, and optionally, wherein performing motion compensation includes performing at least one of locally adaptive block matching or globally adaptive block matching.

Example 73 includes the subject matter of Example 72, and optionally, wherein processing the motion compensated frame includes: merging the intraframe interpolated frame with the motion compensated frame to generate a spatial only estimate reconstructed frame, merging including filling missing Rx scanlines of the intraframe interpolated frame with corresponding scanlines of the motion compensated frame; and processing the spatial only estimate reconstructed frame to generate the reconstructed frame.

Example 74 includes the subject matter of Example 73, and optionally, wherein processing the spatial only estimate reconstructed frame includes performing temporal smoothing by blending the spatial only estimate reconstructed frame with the previous reconstructed frame to generate the reconstructed frame.

Example 75 includes the subject matter of Example 71, and optionally, wherein: the motion vector corresponds to an estimated motion vector $v^*$ between subregions $g_1(x)$ of the previous reconstructed frame and subregions $g_2(x)$ of the intraframe interpolated frame, $v^*$ being given by:

$$v^* = \underset{v \in W}{\mathrm{argmax}} \sum_{x \in B} |g_2(x) - g_1(x-v)|^p$$

wherein x denotes a pixel coordinate of an image subregion, W denotes a spatial window within which a solution for v is searched, B denotes an index set of pixels within a block, and p denotes an error norm equal to 1 or 2; and block matching further includes performing global block matching using a horizontal search only where an entirety of the intraframe interpolated frame corresponds to $g_2(x)$.

Example 76 includes the subject matter of Example 75, and optionally, wherein, in response to a determination that $v^*$ exceeds a threshold value, setting the reconstructed frame to correspond to the spatial only estimate reconstructed frame.

Example 77 includes the subject matter of Example 75, further including merging the intraframe interpolated frame with the motion compensated frame to generate a spatial only estimate reconstructed frame, merging including filling missing Rx scanlines of the intraframe interpolated frame with corresponding scanlines of the motion compensated frame by: segmenting a group R of scanlines of the reduced power partial frame linearly into a collection of S×Hb blocks b; and for each block B and group R: defining a temporary macroblock array mb of pixel values in the intraframe interpolated frame that correspond to a region of the reduced power partial frame of which block B is a core; and performing locally adaptive block matching between mb and the previous reconstructed frame to locate a best match, the best match corresponding to a macroblock region $mb_{match}$ of the previous reconstructed frame having a same pixel dimension as mb; setting the spatial only estimate reconstructed frame to correspond to the reduced power partial frame; and for each block B in the spatial only estimate reconstructed frame: assigning to block B pixel values from a core of $mb_{match}$; and for columns in B corresponding to repeated receive scanlines, assigning a weighted average of pixel values of block B of the spatial only estimate reconstructed frame with corresponding pixel values in the intraframe interpolated frame.

Example 78 includes the subject matter of Example 74, and optionally, wherein performing temporal smoothing includes using alpha blending.

Example 79 includes the subject matter of Example 77, further including, in a sector mode of operation of the imaging device: performing the locally adaptive block matching in response to a determination that an average pixel value in mb is greater than a threshold; and using scan conversion to transform rectilinear formatted scanline data in the reconstructed frame to sector-mode formatted scanline data to generate the reconstructed frame.

Example 80 includes the subject matter of Example 77, and optionally, wherein performing locally adaptive block matching includes, for each macroblock $mb_k$ in an image frame, where k is a number designating each macroblock: computing a total intensity in a prior macroblock $mb_{k-1}$ of the image frame; in response to a determination that the intensity is above a first threshold and that $mb_k$ is not a first macroblock in a given row of the image, assigning a first spatial window W1 to correspond to a value of a spatial window W within which a solution for a motion vector v is to be searched; in response to a determination that the intensity is not above a first threshold or that $mb_k$ is not a first macroblock in a given row of the image, assigning a second spatial window W2 to correspond to a value of a spatial window W within which a solution for a motion vector v is to be searched; determining an estimated motion vector vk* using:

$$v_k^* = \mathop{\mathrm{argmax}}_{v \in W} \sum_{x \in MB_k} |mb_k(x) - mb_{k-1}(x-v)|^p$$

wherein x denotes a pixel coordinate of an image subregion, W denotes the spatial window within which a solution for v is searched, Bk denotes an index set of pixels within a macroblock k, and p denotes an error norm equal to 1 or 2, and wherein matching error $\varepsilon = \sum_{x \in MB_k} |mb_k(x) - mb_{k-1}(x-v)|^p$; in response to a determination that $\varepsilon$ is larger than a second threshold, assigning pixel values from the intraframe interpolated frame to corresponding pixels in a core of $mb_k$; and in response to a determination that $\varepsilon$ is not larger than a second threshold, assigning to a core of $mb_k$ values in a core of $mb_{k-1}(x-v_k^*)$.

Example 81 includes the subject matter of Example 80, and optionally further including, in a sector mode of the imaging device, in response to a determination that $\varepsilon$ is not larger than a second threshold: measuring $\varepsilon$ for four values of v that are offset half of a pixel in either a horizontal direction or a vertical direction; and assigning to the core of $mb_k$ values in the core of $mb_{k-1}(x-v_k^{**})$.

Example 82 includes the subject matter of Example 66, and optionally further including causing transmission of the reconstructed frame to the display.

Example 83 includes an apparatus comprising means for performing the method of any one of Examples 16-29, 39-47, and 66-82.

Example 84 includes one or more computer-readable media comprising a plurality of instructions stored thereon that, when executed, cause one or more processors to perform the method of any one of Examples 16-29, 39-47, and 66-82.

Example 85 includes an imaging device comprising the apparatus of any one of Examples 1-15, 30-38 and 48-65, and the ultrasonic transducer coupled to the apparatus.

Example 86 includes the imaging device of Example 85, further including a housing, the apparatus being disposed in the housing.

Example 87 includes the imaging device of claim 85, further including the display.

What is claimed is:

1. An apparatus of a computing device comprising one or more processors to:
perform rounds of a reconstruction algorithm during image generation by an ultrasound imaging device, the algorithm including, for each round, processing an input frame and a reduced power partial frame to generate a reconstructed frame therefrom, wherein the input frame is based on a first ultrasonic waveform received at a transducer of the imaging device, and the reduced power partial frame defines missing scanlines and is based on a second ultrasonic waveform received at the transducer and generated from an interlaced activation of receive channels coupled to the transducer; and
at least one of generate display signals to cause each reconstructed frame to be displayed on a display, or cause each reconstructed frame to be stored in memory, wherein the input frame, after an initialization round of the reconstruction algorithm, corresponds to a previous reconstructed frame of a previous round of the reconstruction algorithm.

2. The apparatus of claim 1, wherein processing the reduced power partial frame includes:
performing intraframe interpolation on the reduced power partial frame to fill in the missing scanlines with interpolated scanlines to generate an intraframe interpolated frame; and
processing the intraframe interpolated frame to generate the reconstructed frame.

3. The apparatus of claim 2, wherein the reduced power partial frame includes one of odd scanlines and missing even scanlines, or even scanlines and missing odd scanlines, and wherein processing the reduced power partial frame and the input frame includes:
performing motion compensation to estimate a motion vector between the intraframe interpolated frame and the previous reconstructed frame of the previous round to generate a motion compensated frame, the motion compensated frame including even scanlines and missing odd scanlines when the reduced power partial frame includes odd scanlines and missing even scanlines, and including odd scanlines and missing even scanlines when the reduced power partial frame includes even scanlines and missing odd scanlines; and
processing the motion compensated frame to generate the reconstructed frame.

4. The apparatus of claim 3, wherein performing motion compensation includes performing at least one of locally adaptive block matching or globally adaptive block matching.

5. The apparatus of claim 4, wherein processing the motion compensated frame includes:
merging the intraframe interpolated frame with the motion compensated frame to generate a spatial only estimate reconstructed frame, merging including filling missing scanlines of the intraframe interpolated frame with corresponding scanlines of the motion compensated frame; and
processing the spatial only estimate reconstructed frame to generate the reconstructed frame.

6. The apparatus of claim 5, wherein processing the spatial only estimate reconstructed frame includes performing temporal smoothing by blending the spatial only estimate reconstructed frame with the previous reconstructed frame to generate the reconstructed frame.

7. The apparatus of claim 3, wherein:
the motion vector corresponds to an estimated motion vector v* between subregions g(x) of the previous reconstructed frame and subregions $g_2(x)$ of the intraframe interpolated frame, v* given by:

$$v^* = \underset{v \in W}{\operatorname{argmax}} \sum_{x \in B} |g_2(x) - g_1(x-v)|^p$$

wherein x denotes a pixel coordinate of an image subregion, W denotes a spatial window within which a solution for v is searched, B denotes an index set of pixels within a block, and p denotes an error norm equal to 1 or 2; and
   block matching further includes performing global block matching using a horizontal search only where an entirety of the intraframe interpolated frame corresponds to $g_2(x)$.

8. The apparatus of claim 7, the one or more processors to, in response to a determination that v* exceeds a threshold value, set the reconstructed frame to correspond to the spatial only estimate reconstructed frame.

9. The apparatus of claim 7, the one or more processors to merge the intraframe interpolated frame with the motion compensated frame to generate a spatial only estimate reconstructed frame, merging including filling missing scanlines of the intraframe interpolated frame with corresponding scanlines of the motion compensated frame by:
   segmenting a group R of scanlines of the reduced power partial frame linearly into a collection of $S \times H_b$ blocks b; and
   for each block b and group R:
      defining a temporary macroblock array mb of pixel values in the intraframe interpolated frame that correspond to a region of the reduced power partial frame of which block b is a core; and
      performing locally adaptive block matching between mb and the previous reconstructed frame to locate a best match, the best match corresponding to a macroblock region $mb_{match}$ of the previous reconstructed frame having a same pixel dimension as mb;
      setting the spatial only estimate reconstructed frame to correspond to the reduced power partial frame; and
      for each block b in the spatial only estimate reconstructed frame:
         assigning to block b pixel values from a core of $mb_{match}$; and
         for columns in b corresponding to repeated receive scanlines, assigning a weighted average of pixel values of block b of the spatial only estimate reconstructed frame with corresponding pixel values in the intraframe interpolated frame.

10. The apparatus of claim 6, wherein performing temporal smoothing includes using alpha blending.

11. The apparatus of claim 9, wherein, in a sector mode of operation of the imaging device, the one or more processors are to:
   perform the locally adaptive block matching in response to a determination that an average pixel value in mb is greater than a threshold; and
   use scan conversion to transform rectilinear formatted scanline data in the reconstructed frame to sector-mode formatted scanline data to generate the reconstructed frame.

12. The apparatus of claim 9, wherein performing locally adaptive block matching includes, for each macroblock $mb_k$ in an image frame, where k is a number designating each macroblock:
   computing a total intensity in a prior macroblock $mb_{k-1}$ of the image frame;
   in response to a determination that the intensity is above a first threshold and that $mb_k$ is not a first macroblock in a given row of the image, assigning a first spatial window $W_1$ to correspond to a value of a spatial window W within which a solution for a motion vector v is to be searched;
   in response to a determination that the intensity is not above a first threshold or that $mb_k$ is not a first macroblock in a given row of the image, assigning a second spatial window $W_2$ to correspond to a value of a spatial window W within which a solution for a motion vector v is to be searched;
   determining an estimated motion vector vk* using:

$$v_k^* = \underset{v \in W}{\operatorname{argmax}} \sum_{x \in MB_k} |mb_k(x) - mb_{k-1}(x-v)|^p$$

wherein x denotes a pixel coordinate of an image subregion, W denotes the spatial window within which a solution for v is searched, Bk denotes an index set of pixels within a macroblock k, and p denotes an error norm equal to 1 or 2, and wherein matching error $\varepsilon = \sum_{x \in MB_k} |mb_k(x) - mb_{k-1}(x-v)|^p$;
   in response to a determination that ε is larger than a second threshold, assigning pixel values from the intraframe interpolated frame to corresponding pixels in a core of $mb_k$; and
   in response to a determination that ε is not larger than a second threshold, assigning to a core of $mb_k$ values in a core of $mb_{k-1}(x-v_k^*)$.

13. The apparatus of claim 12, wherein, in a sector mode of the imaging device, the one or more processors are to, in response to a determination that E is not larger than a second threshold:
   measure ε for four values of v that are offset half of a pixel in either a horizontal direction or a vertical direction; and
   assign to the core of $mb_k$ values in the core of $mb_{k-1}(x-v_k^{**})$.

14. The apparatus of claim 1, further including the memory, the memory coupled to the one or more processors.

15. The apparatus of claim 1, further including a wireless transceiver coupled to the one or more processors, the wireless transceiver to receive the input frame and the reduced power partial frame from a control circuitry of the imaging device.

16. A method to be performed at an apparatus of a computing device comprising:
   performing rounds of a reconstruction algorithm during image generation by an ultrasound imaging device, the algorithm including, for each round, processing an input frame and a reduced power partial frame to generate a reconstructed frame therefrom, wherein the input frame is based on a first ultrasonic waveform received at a transducer of the imaging device, and the reduced power partial frame defines missing scanlines and is based on a second ultrasonic waveform received at the transducer and generated from an interlaced activation of receive channels coupled to the transducer; and
   at least one of generating display signals to cause each reconstructed frame to be displayed on a display, or causing each reconstructed frame to be stored in memory, wherein the input frame, after an initialization round of the reconstruction algorithm, corresponds to a previous reconstructed frame of a previous round of the reconstruction algorithm.

17. The method of claim 16, wherein processing the reduced power partial frame includes:
performing intraframe interpolation on the reduced power partial frame to fill in the missing scanlines with interpolated scanlines to generate an intraframe interpolated frame; and
processing the intraframe interpolated frame to generate the reconstructed frame.

18. The method of claim 17, wherein the reduced power partial frame includes one of odd scanlines and missing even scanlines, or even scanlines and missing odd scanlines, and wherein processing the reduced power partial frame and the input frame includes:
performing motion compensation to estimate a motion vector between the intraframe interpolated frame and the previous reconstructed frame of the previous round to generate a motion compensated frame, the motion compensated frame including even scanlines and missing odd scanlines when the reduced power partial frame includes odd scanlines and missing even scanlines, and including odd scanlines and missing even scanlines when the reduced power partial frame includes even scanlines and missing odd scanlines; and
processing the motion compensated frame to generate the reconstructed frame.

19. The method of claim 18, wherein performing motion compensation includes performing at least one of locally adaptive block matching or globally adaptive block matching.

20. One or more tangible non-transitory computer-readable media comprising a plurality of instructions stored thereon that, when executed, cause one or more processors to perform operations including:
performing rounds of a reconstruction algorithm during image generation by an ultrasound imaging device, the algorithm including, for each round, processing an input frame and a reduced power partial frame to generate a reconstructed frame therefrom, wherein the input frame is based on a first ultrasonic waveform received at a transducer of the imaging device, and the reduced power partial frame defines missing scanlines and is based on a second ultrasonic waveform received at the transducer and generated from an interlaced activation of receive channels coupled to the transducer; and
at least one of generating display signals to cause each reconstructed frame to be displayed on a display, or causing each reconstructed frame to be stored in memory, wherein the input frame, after an initialization round of the reconstruction algorithm, corresponds to a previous reconstructed frame of a previous round of the reconstruction algorithm.

21. The computer-readable media of claim 20, wherein processing the reduced power partial frame includes:
performing intraframe interpolation on the reduced power partial frame to fill in the missing scanlines with interpolated scanlines to generate an intraframe interpolated frame; and
processing the intraframe interpolated frame to generate the reconstructed frame.

22. The computer-readable media of claim 21, wherein the reduced power partial frame includes one of odd scanlines and missing even scanlines, or even scanlines and missing odd scanlines, and wherein processing the reduced power partial frame and the input frame includes:
performing motion compensation to estimate a motion vector between the intraframe interpolated frame and the previous reconstructed frame of the previous round to generate a motion compensated frame, the motion compensated frame including even scanlines and missing odd scanlines when the reduced power partial frame includes odd scanlines and missing even scanlines, and including odd scanlines and missing even scanlines when the reduced power partial frame includes even scanlines and missing odd scanlines; and
processing the motion compensated frame to generate the reconstructed frame.

23. The computer-readable media of claim 22, wherein performing motion compensation includes performing at least one of locally adaptive block matching or globally adaptive block matching.

24. The computer-readable media of claim 23, wherein processing the motion compensated frame includes:
merging the intraframe interpolated frame with the motion compensated frame to generate a spatial only estimate reconstructed frame, merging including filling missing scanlines of the intraframe interpolated frame with corresponding scanlines of the motion compensated frame; and
processing the spatial only estimate reconstructed frame to generate the reconstructed frame.

25. The computer-readable media of claim 24, processing the spatial only estimate reconstructed frame includes performing temporal smoothing by blending the spatial only estimate reconstructed frame with the previous reconstructed frame to generate the reconstructed frame.

* * * * *